United States Patent [19]

Macedo et al.

[11] 4,443,700
[45] Apr. 17, 1984

[54] OPTICAL SENSING APPARATUS AND METHOD

[75] Inventors: Pedro B. Macedo, 6100 Highboro Dr., Bethesda, Md. 20034; Theodore A. Litovitz, 904 Devere Dr., Silver Spring, Md. 20903; Nicholas Lagakos, Silver Spring, Md.; Robert K. Mohr, Washington, D.C.; Robert Meister, Silver Spring, Md.

[73] Assignees: Pedro B. Macedo, Bethesda; Theodore A. Litovitz, Annapolis, both of Md.

[21] Appl. No.: 377,904

[22] Filed: May 13, 1982

Related U.S. Application Data

[63] Continuation of Ser. No. 117,637, Feb. 1, 1980, Pat. No. 4,342,907, which is a continuation of Ser. No. 859,848, Dec. 12, 1977, abandoned.

[51] Int. Cl.³ .............................................. G02B 5/14
[52] U.S. Cl. ..................................... 250/227; 73/705

[58] Field of Search ...................... 250/227; 73/705; 350/96.15, 96.29

[56] References Cited

U.S. PATENT DOCUMENTS

| | | | |
|---|---|---|---|
| 3,056,297 | 10/1962 | Duke | 250/227 X |
| 3,931,518 | 1/1976 | Miller | 250/227 |
| 4,019,051 | 4/1977 | Miller | 250/227 |
| 4,342,907 | 8/1982 | Macedo et al. | 250/227 |

Primary Examiner—William L. Sikes
Assistant Examiner—Darwin R. Hostetter
Attorney, Agent, or Firm—Fleit, Jacobson, Cohn & Price

[57] ABSTRACT

A sensor for measuring stress, temperature, pressure, sound, etc. comprising an optical waveguide, preferably an optical fiber waveguide, a light source which injects light into one end of the waveguide, a deformer contacting and deforming the waveguide to cause light to couple from originally excited modes to other modes, and an optical detector to detect the change in light coupling caused by deformation of the waveguide.

11 Claims, 25 Drawing Figures

OPTICAL SENSING APPARATUS AND METHOD

This is a continuation of application Ser. No. 117,637, filed Feb. 1, 1980, now U.S. Pat. No. 4,342,907, which is a continuation of application Ser. No. 859,848, filed Dec. 12, 1977, now abandoned.

INTRODUCTION

This invention relates to a device which responds to an external stress. It employs an optical signal to detect the change in mode-coupling properties of an optical (including infrared, visible and near-ultra-violet) waveguide when subjected to a mechanical deformation caused by an external stress. We call this device a stress sensor even though it can be used to measure temperature and strain in addition to force, weight, pressure and sound intensity.

Dynamic pressure sensors for use in air, i.e., microphones, and in water, i.e., hydrophones, for the detection of sound pressure variation have been mainly of the piezoelectric, electrostrictive and magnetostrictive type. Depending on the application and its requirements, i.e, bandwidth, ruggedness, operation in varied environments, etc., some types of sensors are capable of detecting pressures less than $10^{-9}$ bar, (1 n bar). Static sensors are capable of pressure measurement ranging from less than a nanobar to megabars. With these usual types of detectors it is difficult to obtain small size for use in arrays, to achieve protection from electrical noise and crosstalk and to obtain satisfactory operation in hostile environments.

The stress sensor disclosed here overcomes many of the disadvantages of the sensors presently in use. This device has a sensitivity which equals or exceeds those discussed above and depending on the environmental conditions has many advantages including: (1) freedom from electrical noise and crosstalk; (2) withstanding of high and low temperature environments (e.g., temperatures ranging from less than 0° C. to more than 700° C.); (3) withstanding of corrosive environments; (4) having the d-c to wide band capabilities required of multi-signal sources; (5) capability of being easily coupled to fiber optic links for long distance remove sensing; (6) lightness of weight; (7) ruggedness; (8) small size.

Some of the suggested uses of our stress sensor are (a) as a hydrophone which may be used singly or in an array at shallow as well as extreme depths of the ocean; (b) an opto-acoustic microphone for high sensitivity wide band capability; (c) a static pressure sensor able to operate over large pressure ranges yet capable of long lifetime under pressure cycling; (d) an optic barometer and manometer; (e) a displacement or proximity sensor for measurement of displacements less than 1 Å, ($10^{-8}$ cm); (f) an optic seismic detector; (g) a flame detector based on displacement; (h) a thermometer; (i) a pressure switch; and (j) an optical switch. The use of the stress sensor is especially desirable for the above application where extreme environments exist and/or elimination of electrical wire-type transmission lines is desirable since this permits elimination of electromagnetic interference while allowing for considerable reduction in detector size.

To better understand this invention we introduce some fundamental ideas about mode propagation in optical waveguides. Optical waveguides can be planar or cylindrical. The small diameter cylindrical optical waveguides are generally called fibers and usually consist of two concentric dielectric cylinders, the core and the clad. As long as the dimensions of the optical waveguide in which the light signal travels are much larger than the light wavelength, the light can be considered as propagating in the form of rays or beams which are reflected or transmitted at the various boundaries of the waveguide. Even though this ray description is not exact, it is frequently used since it is more intuitive than a wave description.

The geometry of the core and clad of the waveguide, as well as the refractive indices of the core, clad and the surrounding media define the boundary conditions which determine the possible paths that a wave or ray may take in the waveguide. The specific paths consistent with these boundary conditions are called "modes." Which modes are excited, i.e., in which modes light propagates, depends upon the way that light is injected into the waveguide. Individual modes are distinguished by the different angles their ray paths make with the waveguide axis.

The ray picture of the modes is further illustrated in FIGS. 1–5 where we have shown several of the mode types important to our discussion of the invention. We have shown the "bound core," "refractive," "leaky," and "clad" modes schematically in FIGS. 1–4 respectively and have shown the relation between a high and low order mode in FIG. 5.

In FIGS. 1–5 the refractive indices of the core 3, clad 5, and surrounding medium 7 are $n_{c0}$, $n_{c1}$, $n_m$ respectively.

To maintain most of the light guided within the waveguide core, the refractive index of the core is made larger than the refractive index of the clad, that is, $n_{c0} > n_{c1}$ in FIGS. 1–5.

As shown in FIG. 1, a "bound core" mode 9 is represented by a ray propagating at such an angle with respect to the waveguide axis that it is totally internally reflected at the core clad interface. The propagation angle is less than some critical angle determined by the core and clad refractive indices.

The light which propagates at angles greater than the critical angle with respect to the axis can:

(a) As illustrated in FIG. 2, be incident at the core-clad interface at such an angle that it is partially refracted and then is again partially refracted at the interface between the clad and the surrounding medium where only the refractive paths have been shown. Such a mode is called a "refractive mode" 11.

(b) As illustrated in FIG. 3 for the case of a cylindrical waveguide or fiber propagate in a skew path, i.e. such that the ray representing the path never passes through the axis of the fiber. Such a mode is called a "leaky core" mode 13 but can be trapped in the fiber for some distance before its power is radiated away.

(c) As illustrated in FIG. 4, propagate at such an angle that at the core clad interface it is partially refracted and partially reflected and at the clad surrounding medium interface it is totally internally reflected. For the sake of clarity, only the part of the ray 17 which is partially reflected is indicated. Such a mode is trapped in the core clad system and is called a "clad" mode 15.

The bound core modes may also be further characterized by the angle at which they propagate with respect to the waveguide axis. As this angle increases from zero to the critical angle, these modes change from lower order modes to higher modes. This is shown in FIG. 5 where the mode labeled 21 is a higher order mode than the mode labeled 19. The total number of possible bound core modes increases as the diameter of the core increases and as the refractive index difference between the core and clad increases. If the diameter of the core is small enough, and the refractive index difference between the core and clad is small enough, then only one mode can be supported in the waveguide. Under this condition, the waveguide is called a "single mode waveguide," in contrast to the case of a multimode fiber, where up to several thousand modes can be supported.

SUMMARY OF INVENTION

The invention disclosed here is based on our discovery that extremely small deformations of the waveguide will cause significant amounts of light to couple from the originally excited modes to other modes and that by monitoring the intensity of light in one or more groups of modes but not the total light in the waveguide, a device highly sensitive to waveguide deformation and thus to surrounding pressure, temperature, etc. can be made. The main components of the sensor are the source system, the sensing system, and the detection system. The source system comprised of (a) an optical source which generates light, (b) a means of injecting the light into the modes desired, and (c) in some embodiments a transmitting waveguide. The means for appropriately injecting the light into the modes will be described later on in terms of (a) the injection angle of light from the optical source into the waveguide, and (b) removing the energy from specific modes just before the sensing system. The sensing system comprised of (a) the region of a waveguide section which is deformed and called the sensing region, (b) a device which amplifies the effect of applied stress, called the "deformer". The detection system consists of (a) a means for selectively collecting the light from one or more groups of modes which will be described later on, and (b) an optical detector for measuring the light from these modes.

We have invented a stress sensor consisting of at least one optical (including infra-red, visible and near ultra-violet) waveguide, having at least two groups of modes denoted as "A" and "B", each group containing at least one mode. Light emitted from an optical source is injected into the waveguide. Stress on the waveguide results in a change in deformation of the waveguide. This change in deformation introduces a change in the coupling of light among the modes; in this way some of the light is redistributed among these modes. The light power in B modes, measured using an optical detector, is a sensitive measure of the external stress.

Preferably the stress is transmitted to the waveguide via a device which we denote as a deformer and which enhances in some region of the waveguide the effect of the external stress on the change in deformation of said waveguide.

When the sensor is to be used to measure temperature the preferred embodiment involves at least two materials, one of which could be the waveguide itself, with dissimilar expansion coefficients which are configured to produce a deforming stress on the waveguide upon a change in temperature of the region surrounding the sensor.

When the sensor is to be used for the measurement of strain in an object, one embodiment is achieved by connecting respectively the two parts of the deformer to two points on the object in the region where the strain is to be measured.

When the sensor is used to measure pressure the preferred embodiment comprises using an enclosure which converts external pressure changes into deformational changes of the waveguide.

In another embodiment of the sensor the sensitive region of the waveguide is predeformed and the applied stress to be measured causes a change in the amount of this deformation.

In a preferred embodiment of this invention the waveguide is an optical fiber. Preferably when a fiber optic waveguide is used the A modes are chosen to be higher order bound core modes or leaky core modes.

DETAILED DESCRIPTION OF INVENTION

A stress applied to an optical waveguide will cause power to be coupled among the modes of the waveguide. We have discovered that this fact can be used to make an extremely sensitive stress sensor. This sensor consists of three parts: the source system, the sensing system, and the detector system which are described with their preferred embodiments below. It is to be noted that by proper design of the sensing system the stress sensor may be used as a device to measure static pressure, dynamic pressure, temperature, weight displacement or parameters which may be converted to a stress by any means.

Figure 6:
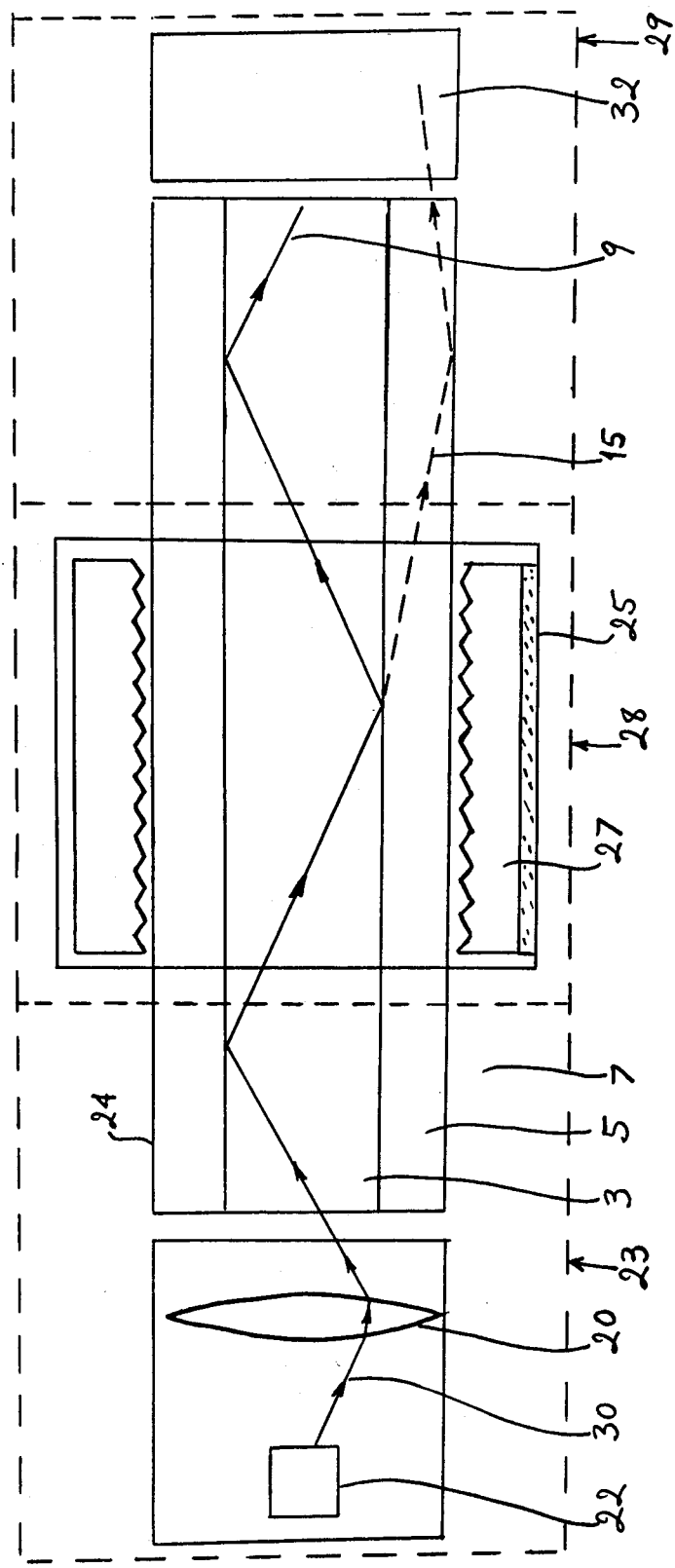
FIG. 6 is a schematic diagram showing a source system, sensor system, and the detector system.

Referring to the drawing, one embodiment of our stress sensor is illustrated in FIG. 6. The principal elements of the system comprise a light source system 23, a sensing system 28, and a detection system 29. As illustrated schematically in this Figure, light 30 from an optical source 22 is focused by a lens 20 into an optical fiber called the transmitting waveguide 24 which has a core 3 and a clad 5. The light is injected such that most of the light energy is in the bound core modes called A modes and substantially less energy is in the clad modes called B modes. One core mode 9 is shown for illustration. Over some short section within the enclosure 25 a mechanical deformation is applied to the waveguide by the deformer 27, which is in the form of two steel pieces having corrugated like surfaces with interleaving ridges forming a vise which would be used to squeeze and thus deform the fiber. For the sake of clarity in the drawings the deformers are shown spaced from the waveguide. It will be appreciated that in practice there is contact during deformation. The deformation causes the light to couple among the various core and clade modes of the fiber. One clad mode 15 excited by the action of the deformer is shown for illustration. The intensity of the clad modes increases at the expense of the core modes.

We have discovered that a very small strain or deformation of the fiber can be detected by monitoring the intensity of the light in the clad modes with a detector 32. The deformation of the fiber is related to the applied pressure on the deformer and we have discovered that the configuration shown schematically in FIG. 6 becomes an extremely sensitive static or dynamic pressure sensor, with modification of the enclosure. The sensor may also be of such an arrangement as to respond to a displacement, strain or temperature rather than pressure or sound intensity.

Source System

In all embodiments of this invention a system is provided to inject light into the sensing system of the stress sensor. This source system consists of a light source, a means of transmitting the light to the sensing system and a means of selectively exciting the modes of the sensor waveguide.

Three embodiments of the source system are described here to define terms and to clarify the following discussion. The first and simplest embodiment consists simply of a light source and appropriate optics to inject light into the waveguide of the sensing system. The second embodiment consists of a light source and appropriate optics to inject light into the transmitting waveguide. The transmitting waveguide and the waveguide of the sensing system are, in the embodiment, parts of the same waveguide. A device to remove or strip i.e., remove energy from the B modes of the waveguide before it enters the sensing system may be present. The third embodiment is identical to the second embodiment with the exception that the transmitting waveguide and the waveguide of the sensing system are not parts of the same waveguide and a coupler is employed. The purpose of the coupler is to couple light from the transmitting waveguide to the waveguide of the sensing system and in some cases to physically join the transmitting waveguide to the sensing system.

The light source can be any device for generating light including incoherent and coherent sources. For efficient light coupling to waveguides it is preferred that the device have a high radiance. Suitable devices would include lasers, light emitting diodes, arc lamps and filament lamps. For high reliability, low cost, small size and for coupling to a multimode waveguide, a light emitting diode is preferred. For coupling to a single mode waveguide, for ease of control of the modes excited or where high light intensity is desired a laser is preferred such as the argon laser of examples 5, 6, 7, and 8. For low cost a semi-conductor laser is preferred. For high intensity a neodimium laser is preferred.

The light source can be either of the continuous wave "CW" types, or it can be pulsed. A pulsed optical source is preferred when many sensing systems are to be used along an optical waveguide. In this case the detected light from different sensing systems has different propagation times and therefore, it can be separated in time. The minimum resolvable distance between sensing systems and/or the maximum transmissible data rate through a fiber is limited by the width of the light pulses and the dispersion of the transmitting waveguide. The light source capable of emitting narrow pulses of the order of 1 nsec or a fraction of a nanosecond wide is a semi-conductor laser such as GaAs or InPAsGa lasers and are preferred when maximum band width is required.

In the simplest embodiment of this invention, the light source injects light directly into the waveguide of the sensing system. If it is desirable to locate the sensing system in an inaccessible or a hostile environment; e.g., at high pressure, temperature, etc. or to avoid the presence or necessity of electrical devices near the area where the sensing system is located, it is preferred to transmit the light from source to sensing system by an optical fiber waveguide. In general for efficiency of injecting light it is preferred that the transmitting fiber have a core diameter and a numerical aperture less than or equal to that of the waveguide in the sensing region. However, in certain situations increased sensitivity is attained by not following this teaching. For example if one wishes to inject light into leaky core modes of the sensing waveguide the numerical aperture of the sensing waveguide should be less than that of the transmitting fiber. In practice it may be part of the same or an identical fiber. If a low cost sensor is desired, a multimode step index fiber is preferred because of its relatively low cost and because it can be used with low cost LED light sources. Other reasons for preferring multimode waveguides is that coupling of light between them is relatively easy and low cost connectors can be employed. This type of waveguide is suitable for static stress measurements as well as many dynamic measurement applications. When the transmitting fiber is long and when a high data rate is maintained utilizing pulse techniques a graded index fiber is preferred because of its greater band width. This fiber also can be obtained with a relatively large core to facilitate coupling between waveguides and is suitable for use with LEDs, as well as with lasers.

If the greatest dynamic frequency range of stress signals is to be measured or in the case of closely spaced sensor arrays where the data rate will be high, a single mode fiber is preferred.

In many embodiments of this invention stress applied to the waveguide in the sensing system couples light from one mode or group of modes called "A" into a second mode or group of modes called "B". The B modes are ultimately detected by the detector system.

Figure 7:
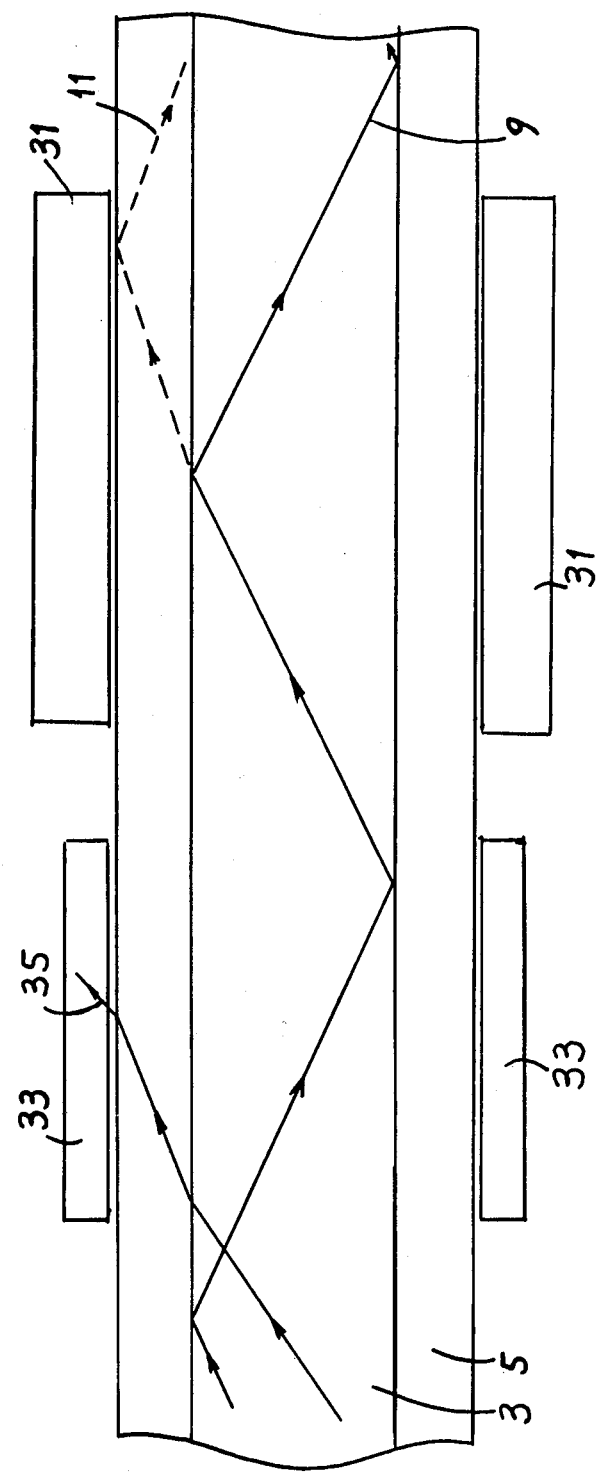
FIG. 7 is a schematic diagram showing stripping of clad modes and sensor system.
Figure 8:
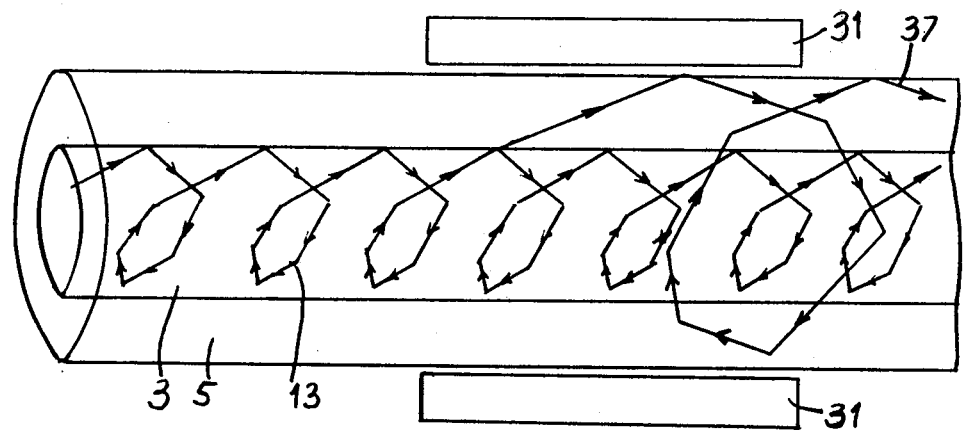
FIG. 8 shows coupling of a leaky core mode to a clad mode by action of a deformer.

In an embodiment of the invention light is coupled into the waveguide of the sensing system with both types of modes, A and B, excited. To improve sensitivity it is preferred to make the power in the B modes less than 1% and preferably less than 0.1% of the power in the A nodes before entering the waveguide of the sensing system. This may be accomplished by injecting light directly into the waveguide of the sensing system or into the transmitting waveguide at such an angle or range of angles with respect to its axis that no B modes are excited. If the transmitting waveguide is perfect, and subject to no deformations, the light will remain in the original excited modes. If the waveguide is not perfect some light will invariably couple to the B modes which must then be stripped. If the B modes are clad modes, they may be stripped as illustrated in FIG. 7 where 33 is the stripper and 35 is the stripped clad mode. For example, stripping may be accomplished by immersing the waveguide in a liquid having the same or higher refractive index or by coating the waveguide with an absorbing jacket of higher index of refraction. If the B modes are leaky modes they can be attenuated by employing a suitable length of transmitting fiber to attenuate these modes. The suitable length must be determined for each transmitting fiber and different light injecting conditions. If the B modes are certain types of bound core modes, they may be stripped by different means, depending on their order. If they are high order modes they may be stripped by employing a fiber section with a decreased core diameter. This will convert these high order B modes to leaky, clad or refractive modes depending on the type of waveguide, which modes will then be attenuated by a suitable length of reduced core diameter fiber or by stripping. As an example of such an embodiment a multimode fiber is considered, which can support few core modes, e.g., eleven. Light is injected into these eleven bound core modes. Before the deformer the fiber is necked down, i.e., a small section of the fiber is heated and stretched so that a neck is formed in which the fiber diameter decreases slightly and then increases to its previous value. If the thinner fiber can support only ten modes, the light from the eleventh mode would couple to clad modes and it can be stripped before the deformer. Next as the fiber diameter increases to its previous value, the eleventh mode can be supported again. In this case all the light would propagate in the ten modes, or modes A, while the eleventh mode, or mode B, would be dark. If the B modes are low order modes, they may be stripped by suitable design of the fiber core. For greatest effectiveness it is preferred that the stripping of B modes be done as close to but ahead of the deformer as is practical. In practice the stripping could be done within the physical structure of the sensing system.

Figure 16:
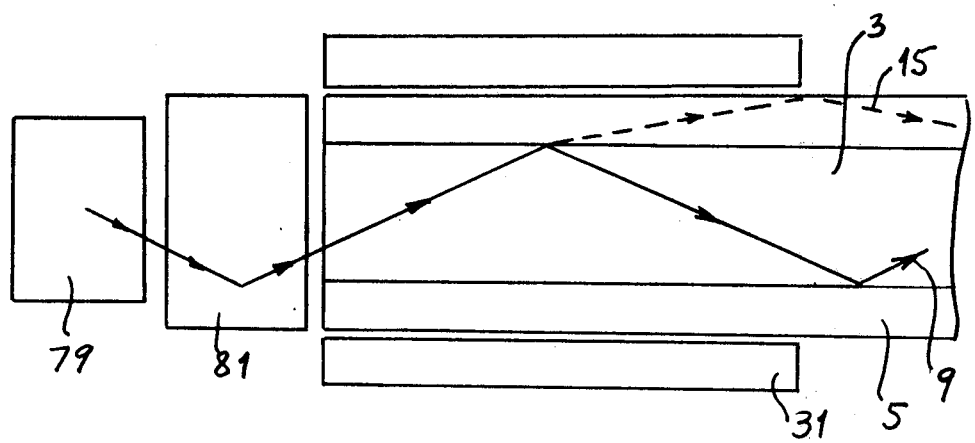
FIG. 16 is a diagram showing source system exciting a bound core mode of sensing system.
Figure 17:
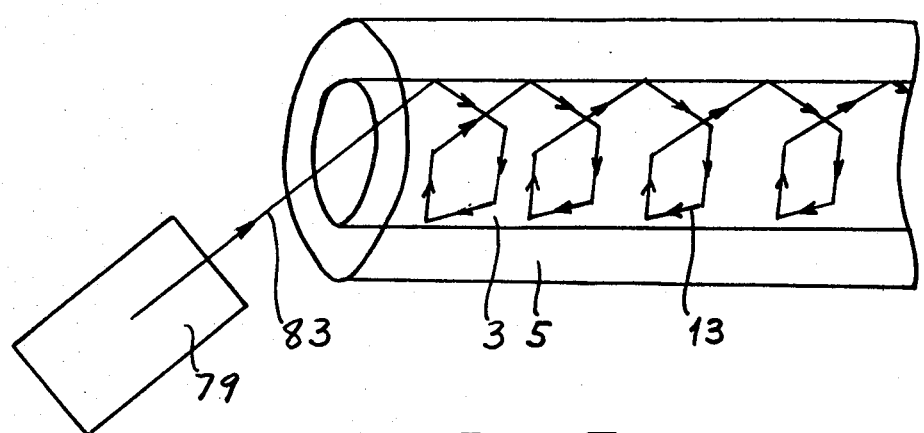
FIG. 17 is a diagram showing source system exciting a leaky core mode in the sensing system.

To inject light into the A modes of the waveguide of the sensing system the simplest embodiment as in FIG. 16 where the A modes are bound core modes or in FIG. 17 where the A modes are leaky core modes is when the light is injected directly from the light source 79 employing suitable lenses and apertures 81 so that light enters the sensing waveguide only at angles that result in excitation of the A modes.

In a second embodiment a transmitting fiber is used where the simplest arrangement would have the sensing waveguide be a part of the transmitting waveguide and stripping is performed as described above to eliminate any B modes. A third embodiment would employ a coupler having suitable lenses and apertures and treating the transmitting fiber as the light source of the first embodiment described above. If the modes excited in the transmitting fiber correspond to the A modes for the waveguide of the sensing system a simple coupler may simple butt the two waveguide ends together. To improve the coupling efficiency it is preferred that index matching material be used between the two waveguide ends. Depending on the desired sensitivity and on the type of transmitting and sensing wave guides employed, different types of A modes are preferably excited. For most applications it is preferred that the A modes be core modes because of their lower attenuation than clad or refractive modes. We have found that light from high order core modes couples to clad modes more easily due to deformation than that from low order modes. Thus if the B modes are to be clad modes it is preferred that the A modes be high order core modes which are excited by injecting light into the sensing waveguide at angles with respect to its axis near the critical angle. Included in the high order core modes are bound core and leaky core modes. If the A modes are to be transmitted a large distance, i.e., greater than 10 meters, it is preferred that the A modes be bound core modes due to their low attenuation. The leaky core modes can be excited by using the following techniques:

(a) the light from an incoherent light source is coupled into the waveguide by a high numerical aperture microscope objective;

(b) the collimated light from a laser is coupled into the waveguide at an angle outside the numerical aperture of the waveguide;

(c) the light from a laser is incident from the side of a tapered core section of a fiber immersed in a fluid whose index of refraction is higher that that of the waveguide core;

(d) bound core modes may be converted to leaky core modes by decreasing the core diameter of the waveguide.

Sensing System

Figure 10:
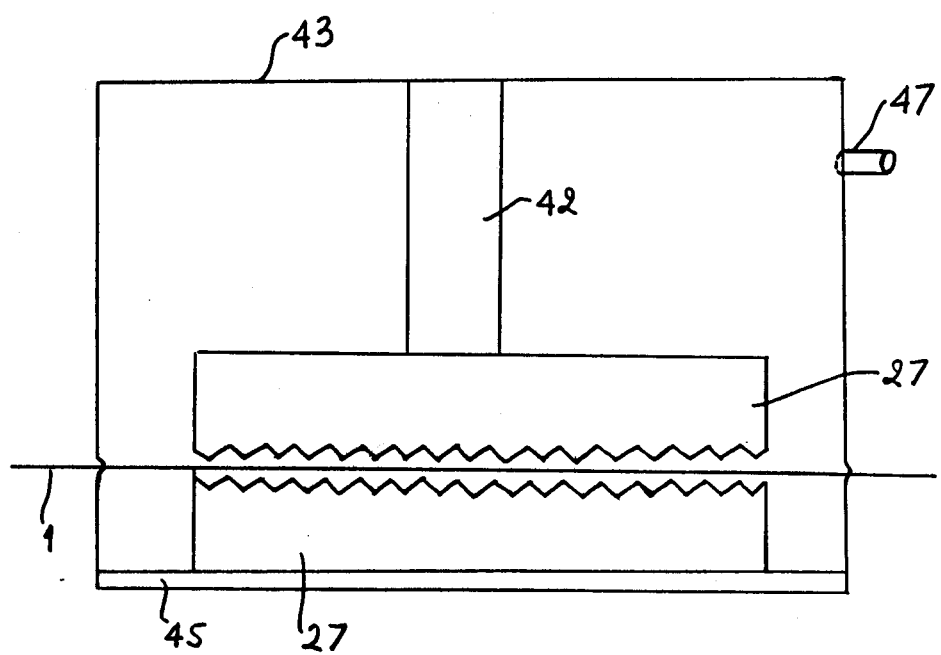
FIG. 10 shows a sensing system with an enclosure.

The sensing region is a section of an optical waveguide arranged in an enclosure in such a fashion that an external stress will cause it to be deformed. Preferably a device we call a deformer is present whose purpose is to enhance the deformation resulting from a given external stress. In the most general case the deformer is any object or group of objects which apply a stress to the waveguide. The design of the deformer depends on the parameter to be measured and several embodiments are discussed below. One embodiment of this sensing system is shown in FIG. 10 and Example 8. The deformer is made of two pieces, 27. The upper piece, is firmly connected to the enclosure 43 by a support 42. The lower piece is attached to an elastic membrane, 45. When either a static pressure or dynamic time varying pressure (sound wave) reaches the membrane, it deflects pushing the lower deformer piece, toward the upper deformer piece, thus deforming the optical fiber 1 which is held against the ridges of the deformer.

Figure 11:
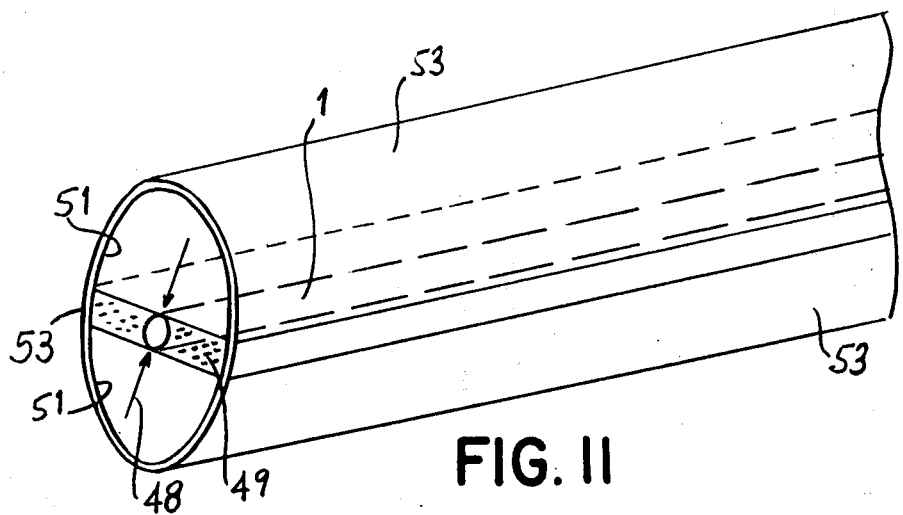
FIG. 11 shows a sensing system having a cylindrical enclosure.

In another embodiment of the invention as shown in FIG. 11, the enclosure is a cylindrical flexible outer jacket, 53. The deformer is composed of two half-cylindrical solid parts, 51, which when a pressure external to 53, is applied, move toward each other to deform the optical waveguide. Region 49 is a fluid space which is not at the external pressure and thus allows a net force to be exerted on the deformer.

Figure 12:
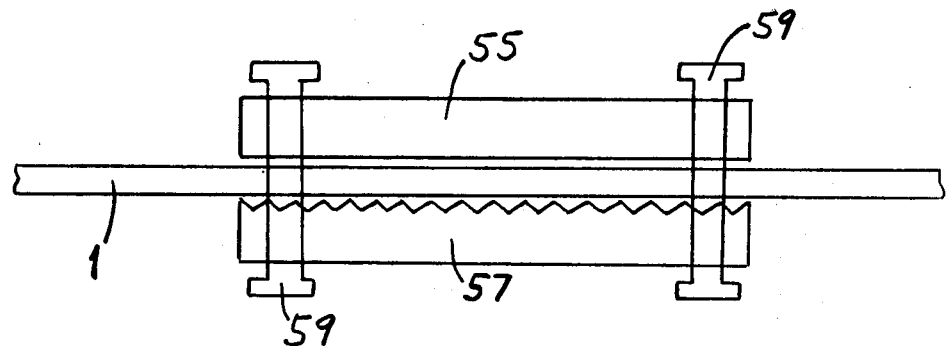
FIG. 12 shows a sensing system for measurement of temperature.

In many embodiments of this invention the sensor detects a displacement of the deformer pieces relative to one another which sets up a stress in the fiber and thus causes a deformation. Depending upon which embodiment of this invention is used, the displacement can be caused by different effects either singly or simultaneously. In each case, however, a force must be applied to the deformer to displace it. In one embodiment the side of the deformer away from the waveguide, but not the waveguide itself, is exposed to a region whose pressure one wishes to measure. The force applied to the deformer, which is pressure times exposed area of deformer, causes the deformer to displace deforming the waveguide. In this embodiment we have a pressure sensing device. This can be used for example in altimeters, for static pressures and in hydrophones for dynamic pressures. If one part of the deformer is connected to an object which is displaced, then a displacement sensor is attained. In another embodiment, a weight placed on the deformer causes displacement. In this case the sensing element is a weight scale. In another embodiment, one part of the deformer is attached to a bi-metallic strip or other system with two materials with dissimilar thermal expansion coefficients which, when the temperature changes, exerts a force on the deformer and the device becomes sensitive to temperature. If desired a combination of effects can be detected. Such a sensor is illustrated in FIG. 12. The material of the deformer pieces 55 and 57 has a different expansion coefficient from the connecting posts 59. A change in temperature will cause a change in stress on the waveguide due to the deformer pieces.

The optimum configuration of the deformer depends on the geometry of the optical waveguide and the desired use of the sensor.

Figure 9:
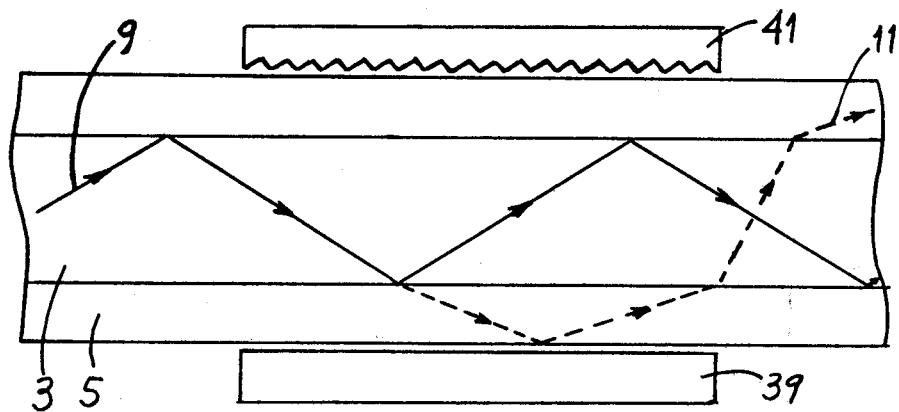
FIG. 9 shows coupling at a bound core mode to a clad mode by action of deformer.

For planar or cylindrical waveguides, the deformer could be as shown in FIG. 7 a simple set of two flat plates 31 between which the fiber is sandwiched. This configuration results in a large shear component in the strain deformation, on application of an external force. Stress amplification which enhances the sensitivity of the sensor, results when one of the two pieces has at least one ridge. The application of external forces in this case causes both shear and compressional strain in the neighborhood of the ridge. The amplification is preferred when increased sensitivity is desired. The edges of the bottom plate can be rounded to keep strains to a defined region. When even higher sensitivity is preferred, the number or ridges should be increased, say to at least 5, as shown in FIG. 9, where 41 is the ridged piece and 39 is the flat piece.

A different method of straining the optical fiber, which enhances the sensitivity, is achieved by flexural deformation. This is accomplished as shown in FIG. 6 by corrugating both plates 27 and sandwiching the fiber in such a way as to allow the ridges to interleave if the fiber is removed. Such a configuration is preferred when high sensitivity is desired. For the case of interleaving corrugations, the spacing of the corrugations may vary from as low as 0.1 millimeter to over one centimeter depending on the sensitivity desired. A variation of this deformer can be obtained by use of points instead of ridges.

Figure 13:
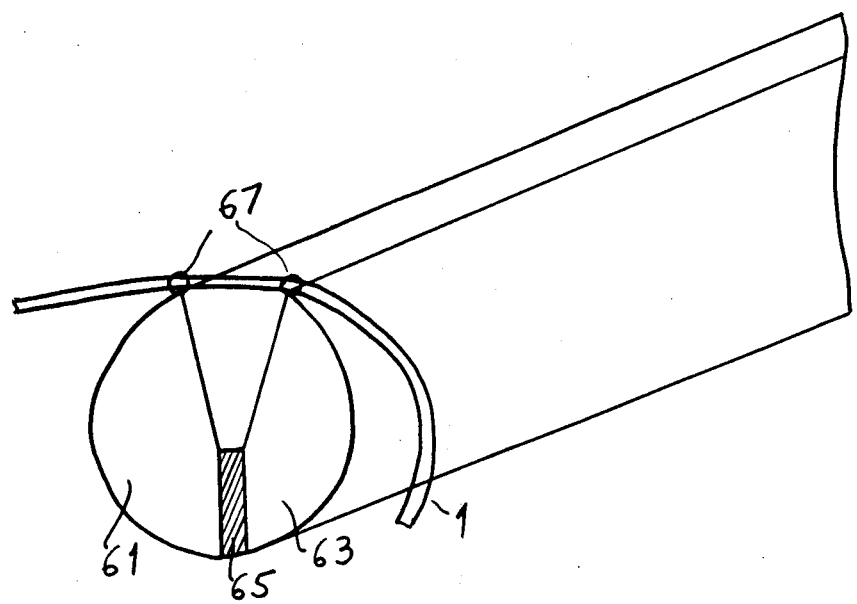
FIG. 13 shows a multi-piece deformer with waveguide attached at two points.
Figure 14:
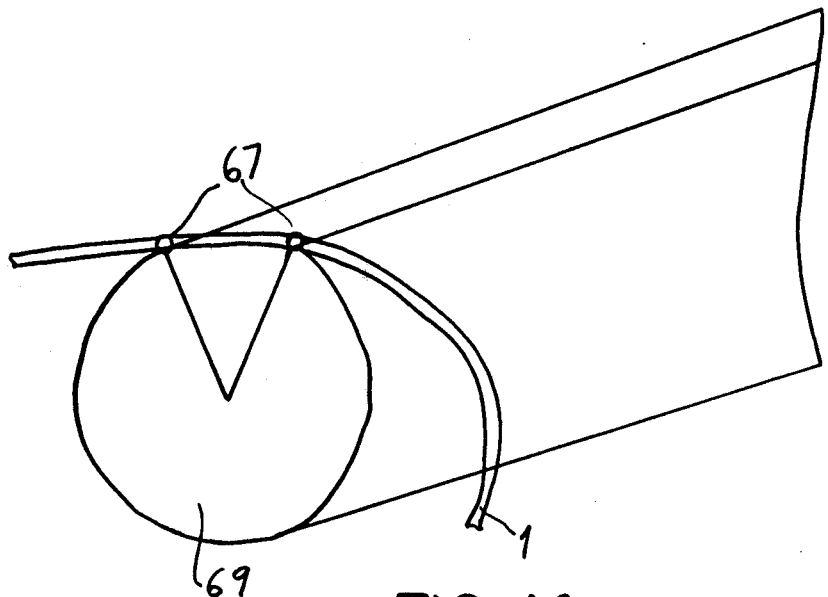
FIG. 14 shows a one piece deformer with waveguide attached at two points.

In another embodiment the deformer is, as shown in FIG. 13, composed of two half cylinders 61 and 63 joined along a portion of the flat face by an elastic material, 65. The fiber is fixed at two points 67 so that a change in separation of the cylinder halves will deform the fiber and cause coupling between modes A and B. In a similar embodiment depicted in FIG. 14, a cylinder 69 is partially split along a diameter with a small wedge shaped region removed. The fiber is attached to the cylinder at points 67 or in another embodiment the fiber is wound around the deformer and held by friction and any opening and closing at the gap would result in a stress on the fiber causing coupling between modes A and B.

The deformer could be a braided or a fibrous cable jacket surrounding the optical fiber. Such a deformer is preferred as more compact and convenient than plates. In this configuration longitudinal as well as transverse stresses on the cable would introduce flexural strains which in turn would cause mode coupling. In another possible configuration the deformer is of the form of a ridged cylinder and split sleeve, and the fiber is wound around the deformer in the shape of a solenoid coil. Such a configuration is preferred when long sensing elements should be utilized. As it was mentioned above, torsional strain can cause mode coupling. In this case the deformer is arranged to cause a twisting of the optical fiber. This is preferred in cases where small angular displacements need to be measured. In a more general case, any combination of the various deformers discussed above can be utilized.

Figure 15:
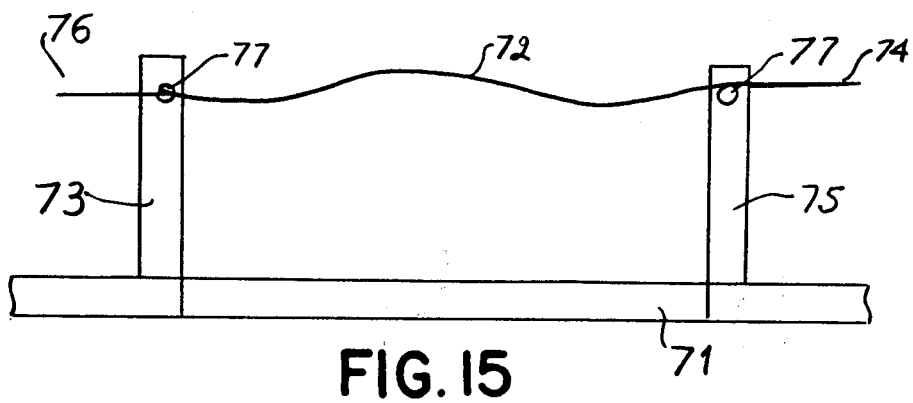
FIG. 15 shows a schematic diagram showing a predeformed fiber.

In other embodiments of the invention the optical waveguide 72, in the sensor is predeformed as is illustrated in FIG. 15. This may be accomplished for example by irregularly curing a plastic jacket, or by inserting the waveguide into a predeformed but flexible jacket, or other such suitable means. In this embodiment the application of external stress changes the amount of deformation. The example illustrated in FIG. 15 is a strain gauge based on this embodiment. The strain between two points, 77 on the object 71 is measured by attaching the predeformed waveguide 72 via supports 73 and 75 to the object. A change in distance between points 77 causes a change in deformation of the waveguide. The optical signal is brought into the waveguide via the transmitting fiber 74 and then goes to the detector via the receiving fiber 76.

The enclosure must serve at least two functions. One is to maintain the relative positions of the deformer and the waveguide yet allow one part of the deformer to be free to move relative to the other part. A second function of the enclosure is to allow a net force to appear across the deformer parts so that they will move relative to each other upon application of external stress. For example, when an external pressure is applied, the enclosure must be designed to insure that the pressure on one side of the moveable part differs from that on the other side so that a net force exists.

When pressure is to be measured the enclosure can be designed to separate out the low frequency components from the high frequency components of the external pressure by using appropriately designed ports which would pass low frequency pressure variations but not high frequencies and vice-versa. A simple sensor configuration for pressure measurement is shown in FIG. 10. The enclosure is constructed with rigid walls 43. In one of the walls a flexible diaphram 45 is installed; which responds to the pressure differential that develops between the external medium and the fluid (gas, liquid, and elastomer) enclosed within the enclosure. In another wall a port 47 is installed which allows the fluid to be exchanged between inside and outside of the enclosure. The deformer 27 is attached to the flexible diaphragm and responds within limits to any pressure difference between the inside and outside of the enclosure. The deformer used in this case is comprised of a set of corrugated plates 27 with one plate attached rigidly to a wall, the other is attached to the moveable diaphragm. The fiber 1 is passed thru the enclosure via small holes in opposite walls and then between the ridges of the deformer.

Another useful configuration would have the fluid enclosure separate from but adjacent to the deformer. In these arrangements if the port were closed the system could be used to measure the total external pressures including both static and dynamic. With the port open this system will respond only to time varying pressures: for a given port size external pressure variation below some frequency depending on the port size may maintain an approximate equilibrium with the internal pressure resulting in near zero differential force on the deformer, and hence no change in deformation of the fiber. The port can thus be used as a frequency filter. If one is interested in audible acoustic frequencies, the port should substantially attenuate frequencies below 1 Hz, while permitting the measure of high frequencies, that is, frequencies above 20 Hz. The upper limit of the sensor response is due to the elastic and inertial properties of the fiber, deformer, and enclosure configuration. The upper limit frequency cut off can be adjusted as desired. In the case of audible frequencies the maximum cutoff should be greater than 25 KHz.

Depending on the configuration of the enclosure and the low frequency pressure transmitting device 47, the sensor could be made to operate as a barometer. In this case the port would be closed; or in another case the sensor with an open port could operate as a hydrophone or microphone.

Under certain conditions it would be preferable to have the waveguide, the source and the detector placed within the enclosure.

We now consider the types of modes one can choose to use for various embodiments of the sensing system. If a fiber optic waveguide is used in the sensing system, light can propagate in three types of modes: bound core, leaky core, and clad modes. Monitoring of any one of these types of modes is a measure of the deformation of the fiber and thus the external stress can be found.

In one embodiment light is injected into one or more of the above mentioned mode types and the light in at least one of the modes is monitored as a function of the waveguide deformation.

Figure 18:
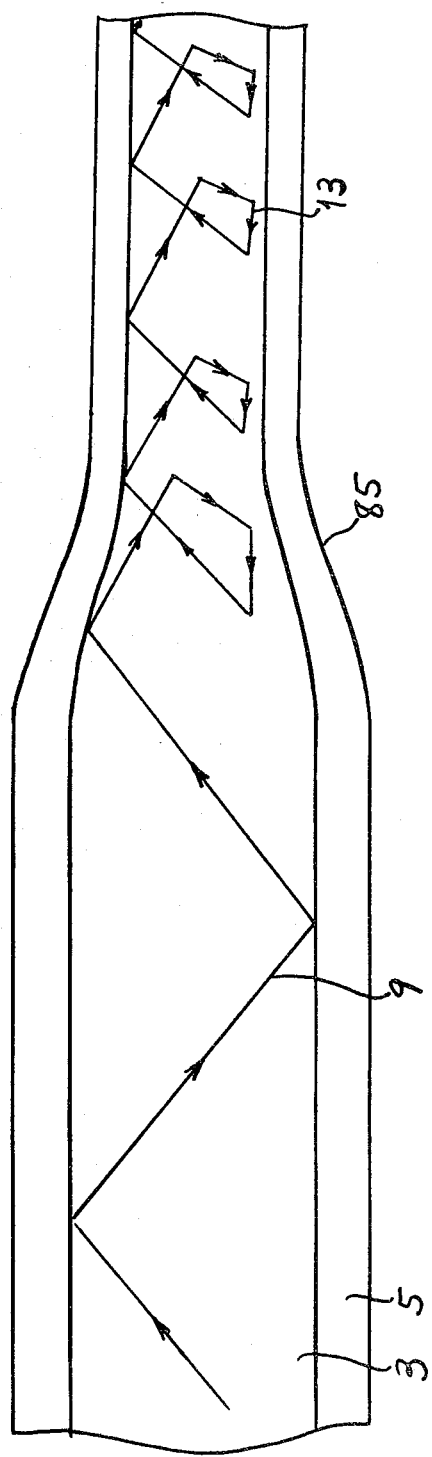
FIG. 18 is a schematic diagram showing generation of a leaky core mode form a bound core mode by necking down the diameter of the optical fiber.

However because of higher scattering at the clad surface, the light in the clad modes is attenuated more than the light in the core modes. Thus, it is preferred to inject the light in the bound core modes, which we label modes A in this case. On the other hand, the clad modes are "dark," i.e., having very little light, and we label these modes B. Any small additional light coupled into the clad modes from the light in the core modes by a deformer would significantly change the light power in the clad modes. Under these circumstances, the detection of the light in the clad modes is preferred. When higher sensitivity is preferred, the clad modes should be "stripped," before entering the deformer region as shown for example in FIG. 7. We have found that light from high order bound core modes couples to clad modes more easily due to deformation than that from low order modes. Thus, in order to enhance the sensitivity of the sensor, it is preferred that modes A be substantially high order bound core modes. In another embodiment the A modes are the bound core modes and the B modes are the leaky modes. In one such embodiment the leaky modes may be excited by necking down a section of the fiber by heating and drawing it out. This is shown schematically in FIG. 18 where 85 is the necked down region of the fiber.

In the case of a "single mode fiber" light can propagate in only one core mode, mode A. In this case modes B can consist of any mode different from mode A propagating forwards, or any mode propagating backwards.

A "multimode fiber," has higher input coupling efficiency than a single mode fiber. When the light source is a light emitting diode, the use of a multimode fiber is preferred.

In a multimode fiber, modes A can also be some lower order core modes, while modes B can be any combination of the higher order bound core modes. For example, light is injected into only the lower order (e.g. the first 10) modes of the sensing waveguide. The higher order modes to be monitored are kept dark. The light in these latter modes is enhanced by deformation of the waveguide which causes light to couple from the lower to the higher modes. The light intensity in the higher order modes is thus a measure of the deformation of and thus external stress on the optical waveguide.

In another embodiment of the invention we have found that light from the leaky core modes can easily couple to the clad modes of an optical fiber. In practice the bound core and leaky core modes may both be excited as A modes with the clad modes being B modes but it is preferred in this embodiment that the sensor consist of an optical fiber carrying light substantially in the leaky modes. After distortion of the fiber by the deformer, light in the leaky core modes is found to couple to the clad modes. The reverse coupling has also been found to occur after deformation of the fiber.

In still another embodiment of this invention we have found that light from the leaky core modes can couple to the bound core modes and more easily to higher order bound core modes when the fiber is deformed. Thus if the bound core modes are kept dark (modes B) and the leaky core modes are excited (modes A) the strain of deformation of the fiber can be measured by monitoring the light coupled to the bound core modes. A preferred embodiment of this is when the high order bound core modes and leaky core modes are the A modes. This can be utilized as follows. Assume that light is injected into the fiber in all core modes. After some long distance and before the deformer, the fiber is necked down by heating and stretching a small section. This would allow light to propagate in all core modes except the highest ones which are now kept dark. At the deformer, light from the lower order bound core and leaky core modes would couple to the higher order core modes. These high order core modes could then be separated out by spatial filtering of the light coming from the end of the fiber and then detecting this light.

A fiber can have a multistructure configuration with more than one clad. Since such a fiber suffers less attenuation due to microbending, it is desirable to use a multicladding fiber when such losses are of major consideration. Also a fiber can have more than one core surrounded by the same clad. In this case, modes A can be in one core, while modes B can be in another core.

A deformation of a fiber applied by a deformer will cause a redistribution of light among various modes. In particular, some of the light in the core modes propagating in the forward direction will be coupled to the light in the core modes propagating with backward direction, i.e., form the deformer back to the light source. This light can be detected by putting a beam splitter, e.g., a half-silvered mirror at 45° with respect to the fiber exis, between the light source and the front end of the fiber. Even though the sensitivity of such a sensor is expected to be reduced, such a system is preferable under conditions of large fiber deformations, because it is simpler and less expensive since only one fiber is used.

Most types of optical waveguides can be used in this invention. For example, the optical waveguides can be planar with two or more dielectric layers. In this case, integrated optics techniques could be used for manufacturing such a waveguide. Light can be injected into certain modes A, e.g., the first 2 guided modes. The remaining guided modes B, are kept dark. Any deformation of the waveguide could couple light from bound core modes A to modes B, i.e., from the first two bound core modes, too, for example, the third bound core mode. Note this example shows that one need not couple between two different types of modes but one can couple between lower and higher order modes of a single type. The power of the light in modes B, i.e., the third mode, is finally detected by an optical detector. If a compact sensor is desired, then the source, the waveguide, and the detector can be fabricated on a single subsbrate.

Detector System

The purpose of the detector system is to monitor the changes in the power in the B modes. The actual form of the detector system will depend on the type of B modes to be monitored, the sensitivity required and the use of the sensor. The detector system consists of a means to isolate the B modes, a means for transmitting them to an optical detector and the optical detector.

Figure 20:
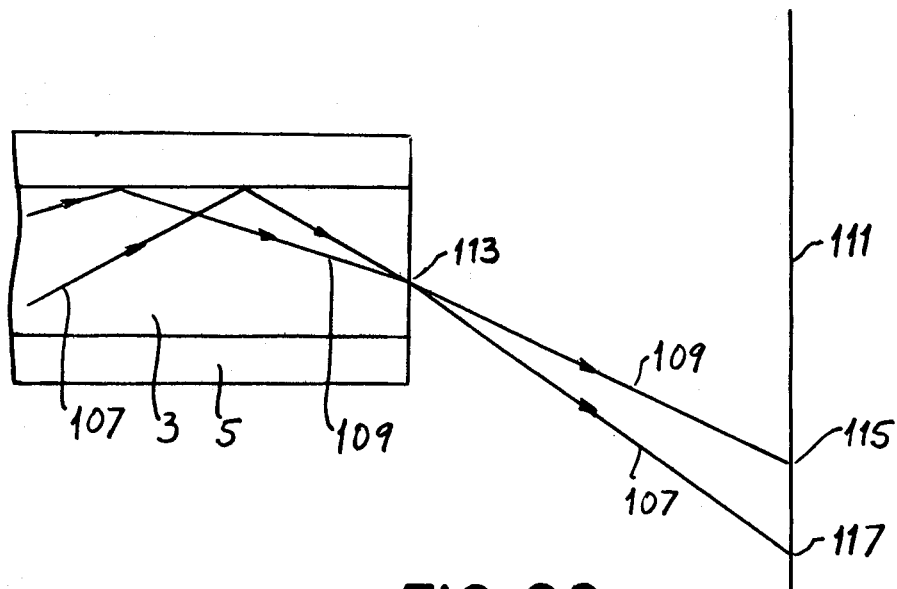
FIG. 20 shows a far field detection system.

The means for isolating the B modes depend on the type of B modes to be detected and the distance by which the detector system and the sensing system are to be separated. In the simplest embodiments the detector system is located within 10 meters of the sensing system but preferably as close as is practical to the sensing system. In these embodiments if the B mode or modes are specific bound core modes, they can be isolated by observing the far field intensity directly with a detector. For example if the waveguide is capable of supporting 11 modes and 10th and the eleventh modes are the B modes the optical power in these modes is separated from that of the other modes in the far field radiation pattern. As illustrated schematically in FIG. 20 the power in these two modes indicated by the rays 107 and 109 may be monitored by placing optical detectors 115 and 117 in the areas in the observation plane 111 which contain power from the B modes.

Figure 19:
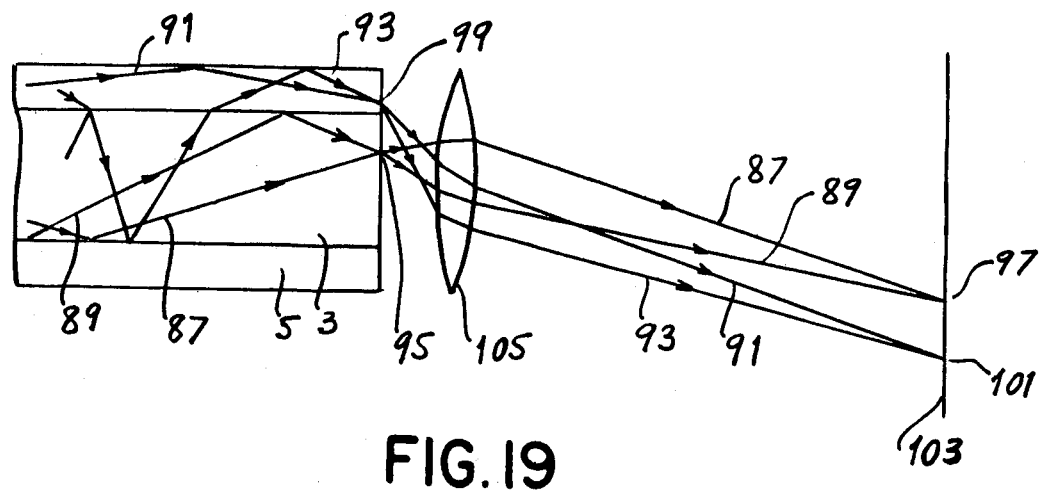
FIG. 19 shows a near field detection system.
Figure 21:
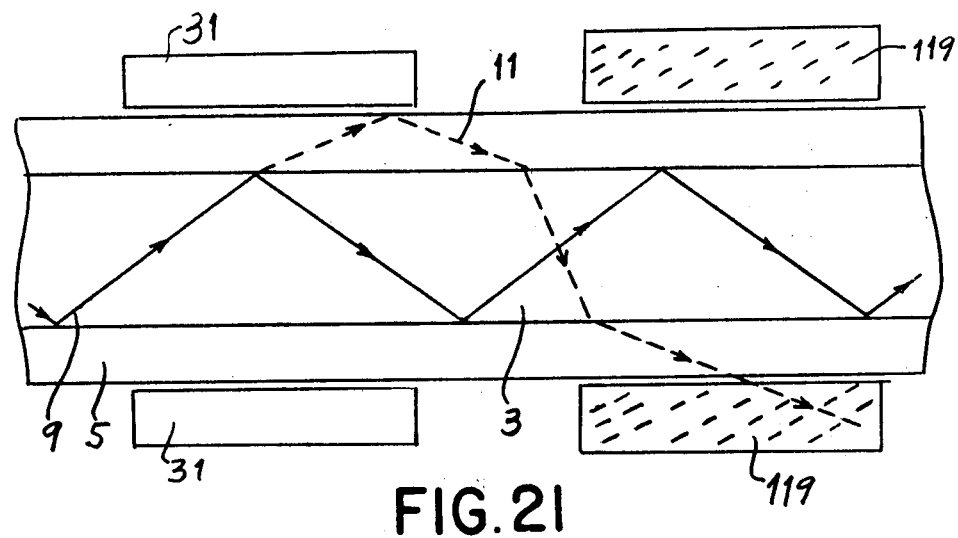
FIG. 21 shows a method for detection of clad modes.

If in any embodiment the B modes are leaky modes they may be observed by monitoring the near field power distribution of the radiation from the end of the fiber. It is preferred that for this embodiment that a step index fiber be used. In this case the power in the leaky modes appears superimposed on a constant background of power from the bound core modes and thus the contribution from each type of mode is easily separated in the near field pattern. If in any embodiments the B mode or modes are clad modes they may be detected by observing the near or far field power distribution. In the near field the light in the clad modes such as 91 and 93 forms a ring around the light from the core modes such as 87 and 89 and is thus detected as illustrated in FIG. 19 by a suitable geometric arrangement of optical detectors 101 within the ring formed by the light form the clad modes. A similar arrangement was used for detection of the clad modes in example 1. A ring-shaped detector could be used for the detection or the center of the light distribution can be blocked and then the ring can be focussed down onto the surface of an optical detector. In another embodiment where the B modes are clad modes, the detector as illustrated in FIG. 21 may consist of an integrating cell 119 filled with a medium having index equal to or greater than that of the waveguide clad. In this case the clad modes are stripped by the index matching medium and are detected within the integrating cell.

If the B modes are to be detected at a large distance from the sensing system it is preferable to couple the B modes to the bound core modes of another fiber waveguide, called the detection waveguide, for subsequent detection by the detector. The detector could be (a) more than 10 meters from the hostile location of the deformer, e.g., at high temperature and/or pressure; (b) more than 500 meters from the location of the deformer in the case where central location for collection of information is desireable, e.g., acoustic detection for security purposes in a bank; (c) further than one kilometer from the inaccessible location of the deformer, e.g., deep in the ocean.

As in the case of a remote source, choices of the detector waveguide for remote detection would be similar to those for the transmitting waveguide. Depending on the type of B modes, various methods of coupling to the bound core modes of the detector waveguide are preferred. They may be coupled out of the core of the sensing waveguide into the core of the detector waveguide by coupling the fields of the leaky modes to the core of the detector waveguide. In one embodiment the waveguide could have a section with two parallel cores. The first core would contain the B modes which can couple through their evanescent fields to the bound core modes of the second core. In a second embodiment a prism coupler could be used to couple power form the leaky modes of the sensor waveguide to the bound core modes of the detector waveguide.

Figure 22:
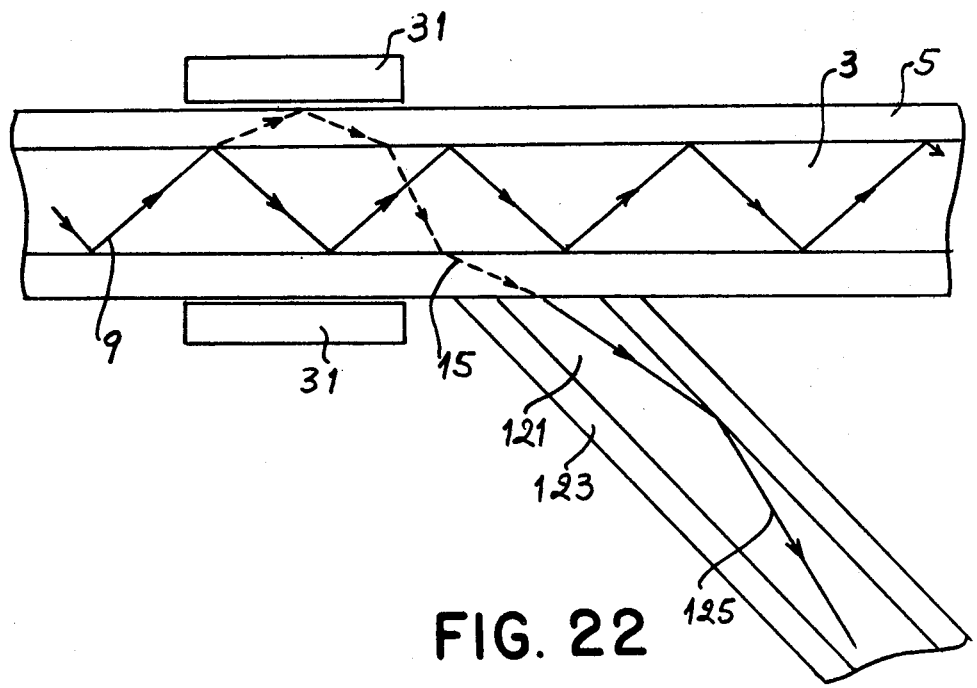
FIG. 22 is a schematic showing coupling of a clad mode of one fiber to a bound core mode of another fiber.

If the B modes are clad modes, they may be coupled to the bound core modes of the detector waveguide. This can be done for example by fusing or gluing a small section of the clad of the sensor fiber to the core of the return fiber as is illustrated in FIG. 22 where 121 is the core and 123 the clad of the return fiber and 125 is a core mode of the return fiber. In another embodiment the clad modes could continue to propagate in the clad if an outer clad of lower index than the inner clad is provided for the return fiber. As an example the outer clad could be a low index plastic. If the B modes are high order bound core modes they may be converted to leaky and clad modes by reducing the diameter of the core of the waveguide and then coupling to low order bound core modes of the detector waveguide as discussed above. If the B modes are low order bound core modes, they may be transmitted to the detector through the detector waveguide with no changes.

There are many types of detectors that can be used. If cost is of major consideration, an inexpensive silicon diode is preferred as a detector. Moreover, a silicon diode has optimum detectivity in the range of wavelengths of 0.8 to 0.9 μm where an optical fiber could have very small loss. Such a diode is a silicon PIN diode which has linear responsivity over a wide range of optical power. Thus, when a detector with linear responsivity is desired, a silicon PIN diode is preferred. On the other hand, a silicon avalanche diode can detect lower light power than a PIN diode. Therefore, when very low light power is to be detected, a silicon avalanche diode is preferred. Another detector very sensitive in the region of wavelengths less than 0.7 μm is a photo-multiplier. Such a detector is preferred when maximum sensitivity is desired.

Dual Nature of Sensor

The invented sensor can be used for measuring force, as well as displacement; when the force is in the form of weight on the deformer as in example 1 the sensor can be used to measure weight. When the deformer is exposed to a pressure a total deforming force equal to the pressure times area of deformer is transmitted to the fiber. To understand this dual nature of the sensor a simple example is considered. A section of an optical fiber is supported by two ridges, while a force is applied to the fiber by a third top ridge, which interleaves the bottom two ridges. It can be shown that the displacement, y, of the fiber is given in terms of the force F applied to the upper tooth by the following equation:

$$Y = \frac{4FL^3}{3E\,d^4}$$

where L is the distance between the two supporting ridges, E, is Young's Modulus of Elasticity of the optical fiber material, and d is the fiber diameter. Using a typical set of numbers, e.g. $L=0.3$ cm, $F=10^{-3}$ dynes, $E=7.3\times10^{11}$ dynes/cm$^2$, and $d=0.01$ cm ($=100$ μm), the value of the displacement is found to be:

$$y = 0.2\times10^{-8}\ cm = 0.2\ Å.$$

That is, a force of $10^{-3}$ dynes would result in a displacement of 0.2 Å.

In order to estimate the highest frequency range over which the sensor is effective, one should calculate the resonant frequency of the waveguide. It can be shown that the fundamental resonant frequency $f_1$ of the system above is given by $$f_1 = \frac{d}{8L^2}\sqrt{\frac{E}{\rho}}$$

where $\rho$ is the density of the fiber material. Using the same numerical values listed above with $\rho=2.2$ gm/cm$^3$ it is found that $$f_1 = 25\ KHz$$

This value for the fundamental resonant frequency can be increased by decreasing L.

In considering the response of the sensing element, one should consider the mass of the deformer, other resonances of the system, etc. However, the fundamental limitation comes from the waveguide, as it was discussed above. For frequencies low compared to the fundamental resonant frequency, f, the response of the sensor is a weak function of the frequency. For higher frequencies the response of the sensor would exhibit peaks at the resonant frequencies of the waveguide.

Multiple Sensors

Pressure sensors discussed above may be arranged in a spatial array to provide information such as bearing of a sound source. A line configuration of sensors along a long cable can be used for passive sound detection. The number and spacing of sensors will determine the directivity of the array. At some distance from the source of light, a set of pressure optic sensors are arranged in a series connected by an optical fiber waveguide with spacing between sensors depending among other things on the wavelength of the sound to be detected. An essential feature of this system is that the light injected in A modes suffers little attenuation as it propagates along the fiber and past the sensors. At each sensor, where the waveguide deformation takes place, only a small fraction of the light is coupled to mode B, the dark mode. Such an array may be fixed in place with the signals monitored from a fixed station in which case the transmitting and detector cables need only be long enough to reach from the monitoring station to the area in which the sensors are arrayed or they may be towed from a moving station such as a ship. In the case of a towed array it may be necessary that the sensor array be separated by some distance from the towing station to avoid the detection of noise from the towing station. In this case it is preferred that the sensor array be a distance of the order of 1 km from the towing station.

Figure 23:
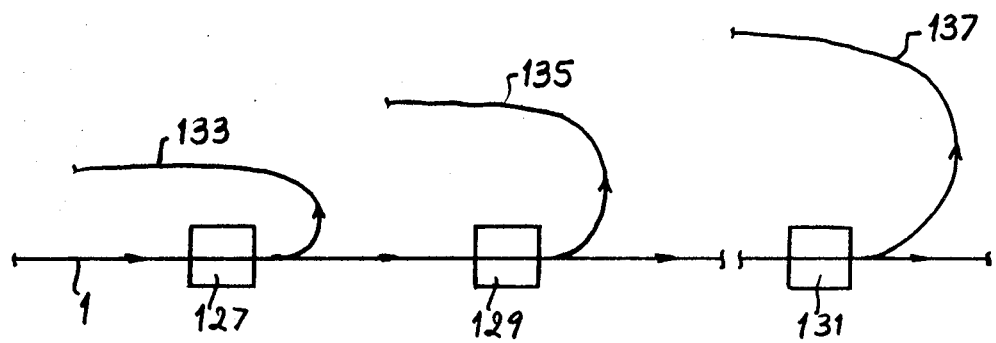
FIG. 23 shows a multi-sensor system with a return fiber to the detector from each sensor.
Figure 24:
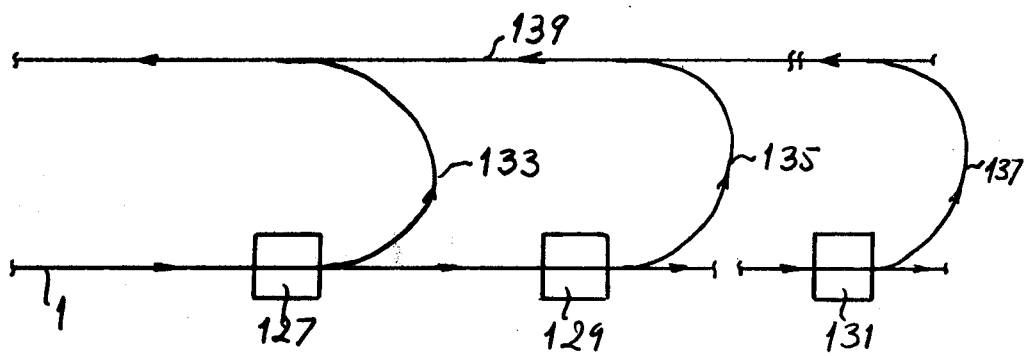
FIG. 24 shows a multi-sensor system with return fibers coupled to a common fiber.
Figure 25:
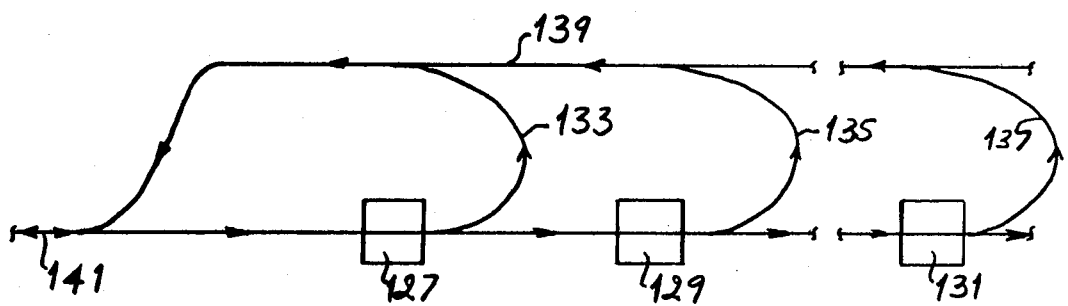
FIG. 25 shows a multi-sensor system where the common return fiber is coupled to the source system fiber.

An optical fiber is a relatively inexpensive optical waveguide. Therefore, the use of an optical fiber is preferred when cost is of major consideration. Moreover, an optical fiber is available in various lengths, up to some kilometers. After each deformer the light in modes B can couple into another fiber which is connected to a detector. This is illustrated schematically in FIG. 23 where 133, 135 and 137 are fibers returning signals from sensing systems 127, 129 and 131 to their respective detectors. This is preferred since it allows the use of more than one deformer on a single long length of optical fiber waveguide. Moreover, when a pulsed laser is used as the light source, the optical fibers carrying light from modes B are preferred to couple to one common return fiber since this reduces the cost of the pressure sensor. This is illustrated schematically in FIG. 24 where 133, 135 and 137 are fibers connecting the sensing systems 127, 129 and 131 to the return fiber 139. In the case of a common return fiber the light from different sensors can be separated by the time delay introduced because of spatial separation between the sensors. In fact this common return optical fiber when preferred can be the main fiber. Such an embodiment is shown in FIG. 25 where the fiber section 139 is joined to the main fiber 141. In this case, in the main fiber there would be light propagating in both directions.

In some cases various parameters of a system should be monitored as a function of time, e.g., in a drilling well it is desirable to know temperature, pressure, etc., at the same time. In such a case it is preferred to use different deformers for different uses. In one embodiment the sensor array would consist of temperature and pressure sensors spaced as desired along the waveguide. In other cases one parameter of a system should be monitored as a function of another parameter, e.g., with a sensor in the form of a long array in the ocean, temperature can be monitored as a function of depth. This can provide various information, e.g., about ocean currents useful for fishing, etc.

As a further illustration of multiple sensors, consider a simple array with many deformers along a straight fiber. They are spaced for determining the direction of a source producing sound waves, e.g., a ship in the ocean. Let us now suppose that the light in B modes is coupled to a very short fiber which in turn is coupled to a common return fiber as in FIG. 24. Additionally we suppose that the sensing regions are separated by 0.375 meters (which is ¼ wavelength of sound in water at 1K Hz). The difference in arrival times of the light coming from two neighboring deformers is t=3.7 nsec. (Note this includes that fact that light arrives later in the sensing region 0.375 meters further away from the source.) In order to resolve such a time difference, a GaAs laser should preferably be used as the light source. On the other hand, a Nd:YAG laser can be used when the deformers are considerably further apart, since usually it emits pulses 90 nsec or more wide, but has more power. Moreover, due to pulse dispersion the light pulses become broader as they propagate through the fiber. Thus, in the present embodiment if the deformers are at a distance of, say, 300 meters or more from the light source, a step fiber cannot be used because the light pulses would overlap, and therefore, they could not be resolved. In this case a graded index fiber or a single mode fiber should be used since these will in general have the necessary band width to propagate a 1 nsec pulse.

EXAMPLES

In all the following examples the optical waveguide was a step profile, multimode optical fiber consisting of a core and a clad without any coating. The fiber was made by the molecular stuffing process (U.S. Pat. No. 3,938,974). It had a 96% silica clad and a core doped with cesium oxide. The numerical aperture of the fiber was 0.22. The core diameter was ~75 μm and the core plus clad diameter was ~105 μm. The attenuation of the fiber was found to be ~22 dB/km at 0.9 μm wavelength and full numerical aperture.

As a figure of merit for comparing different embodiments of this invention it is useful to define a quantity we label the force mode coupling sensitivity, K. This is defined as $$K = \frac{P_B - P_o}{P_A F}$$

where $P_B$ is the total optical or infrared power in the normally dark modes B including that due to deformation of the optical waveguide; the force, F, on the deformer, $P_o$ is the background optical power in modes B and $P_A$ is the optical power in modes A. In the examples below $P_B = P_{cl}$ the power in the clad, and $P_A = P_{co}$ the power in the core.

Static Pressure

Example 1

In the example the light source was a xenon lamp emitting incoherent light in the visible and infrared wavelength region (0.4NA which was chopped and focused by a 20× microscope objective on the end of the fiber forming a cone. The axis of this cone was in line with the fiber axis. A 5 cm section of a 2 meter long fiber was subject to pressure applied by a deformer. The deformer consisted of matched steel pieces having corrugated or sawtoothlike surfaces with interleaving ridges having a period of 1 mm and with edge sharpness of ~25 μm. A magnified image of the fiber output face is formed at the image plane of a 20× microscope objective and a projection lens. A silicon PIN diode detector was arranged to scan the image field transversely. The output of the detector was fed into a lock-in amplifier and then to a computer for analysis. Such a detection system permitted us to study separately the light in B modes or clad modes, with power $P_B$, and the light in modes A, core modes with power $P_A$.

The top piece of the deformer weighed 45 grams. On top of this piece weights were added. Thus, $P_B/P_A$ was studied as a function of applied weight. In the limit of small weights we found:

$$P_B - P_o = (1.6 \pm 0.3) \times 10^{-4} P_A/\text{gm} \qquad (1)$$

where $P_o$ is the power of the background light which will be discussed later. Thus for this embodiment of the invention the force mode coupling sensitivity $K = (1.6 \pm 0.3) \times 10^{-4}/\text{gm}$. For weights greater than 45 gm the sensitivity decreased, indicating non-linear behavior.

Figure 1:
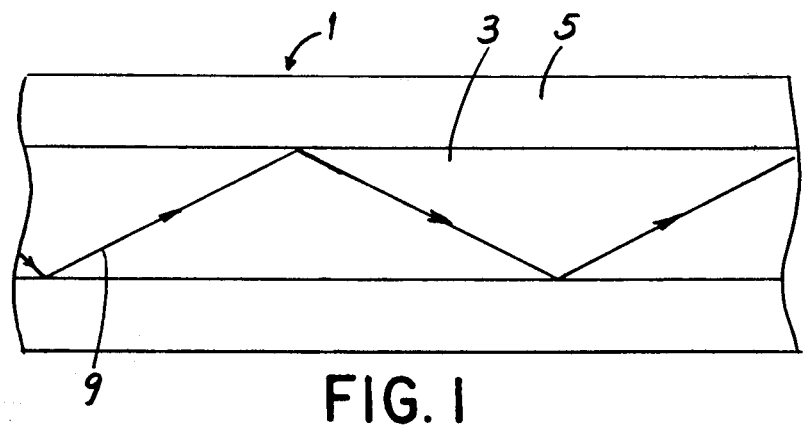
FIG. 1 shows one bound core mode in an optical waveguide.
Figure 2:
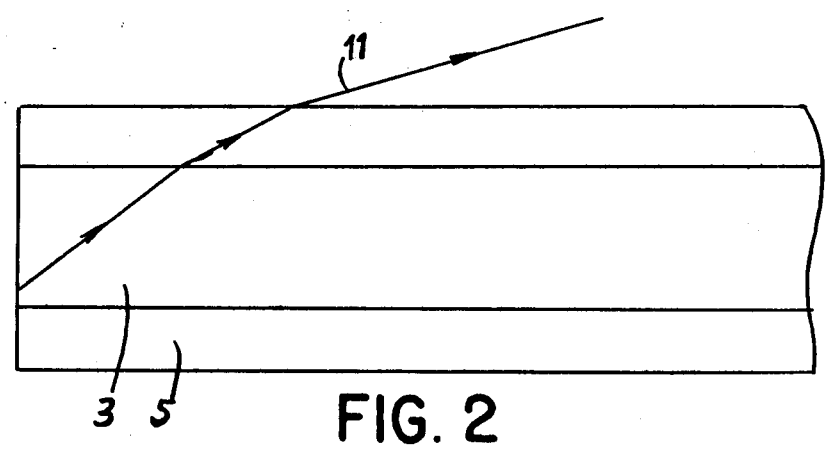
FIG. 2 shows one refractive mode in optical waveguide.
Figure 3:
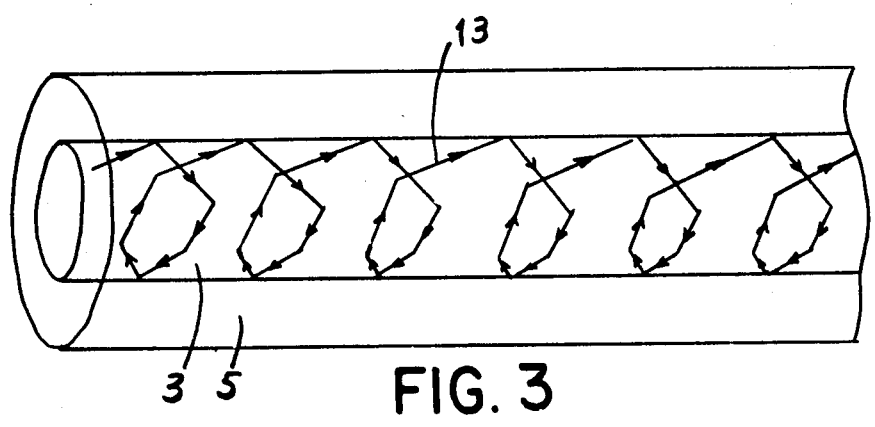
FIG. 3 shows one leaky core mode in a fiber optic waveguide.
Figure 4:
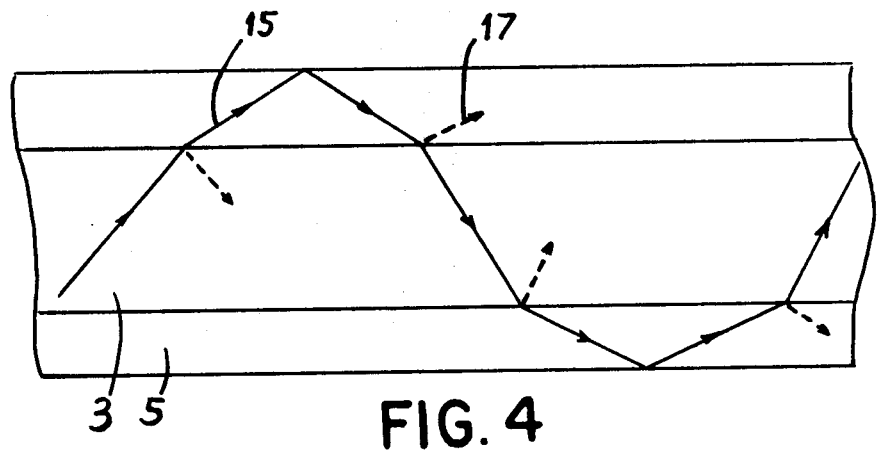
FIG. 4 shows one clad mode in an optical waveguide.
Figure 5:
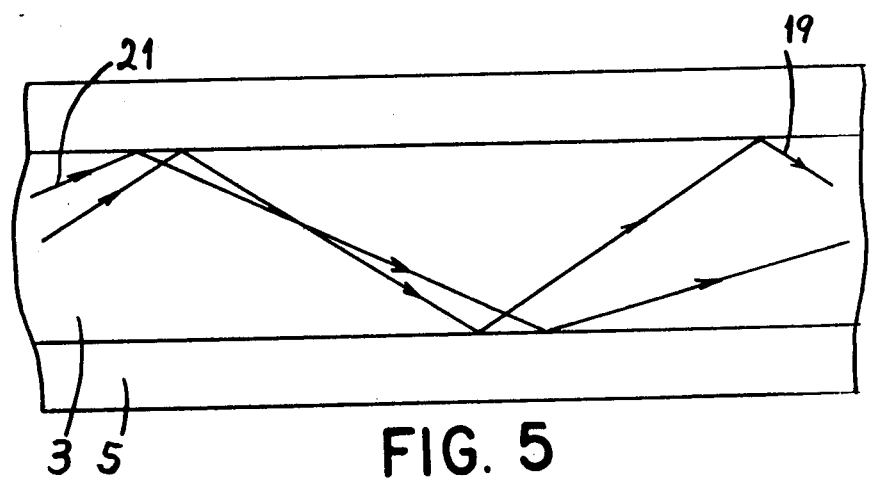
FIG. 5 shows two bound core modes in an optical waveguide.

Propagation of light in the clad modes is depicted in FIG. 4. As it can be seen, clad modes propagate both in the core and in the clad. The ratio of the intensities between the reflected and refracted beam at each interface is a complicated function of the incident angle, the change in index of refraction and the polarization of the ray. However, a substantial part of the power of the clad modes propagates in the core. Thus, when we detect the light in the B modes, which in this case are clad modes, using near field imaging of the fiber end, we substantially underestimate the sensitivity of the sensor. If a coupler was built that could extract substantially all the power in clad modes, the sensitivity could possibly be increased by a factor of two or more.

Example 2

In this example the periodicity of the interleaving ridges of the two corrugated pieces of the deformer was 0.3 mm while all the other components and dimensions were the same as in Example 1. The force mode coupling sensitivity, K, of the sensor was found to be $(1.4 \pm 0.4) \times 10^{-4}/\text{gm}$, similar to that found for Example 1, Eq. (1), for weights up to ~50 gm, while for bigger weights it was found to be smaller.

Example 3

In this example, the shape of the two pieces of the deformer were different from the case of Example 1, while all other components were the same as in Example 1. Two different experiments were done in this Example. In the first experiment, the top piece of the deformer was flat while the base piece was corrugated with a ridge period of 1 mm. The force mode coupling sensitivity of the sensor in this case was found to be $(2.0 \pm 0.4) \times 10^{-5}/\text{gm}$. This is approximately 8 times less than the sensitivity of the sensor in Example 1. However, the response of the present sensor was found to be a linear function of weight up to or more than 450 gm. Thus, even though such a sensor has smaller sensitivity than the sensor in Example 1, it could be useful when linear responsivity over a larger dynamic range is desired.

In the second experiment, the deformer consisted of two flat pieces. In this case the force mode coupling sensitivity was found to be appreciably lower than the sensitivity of the sensor using one flat and one corrugated surface.

Example 4

In this example every component was the same as in Example 1. The only difference was the way that the light from the light source was focused on the end of the fiber in such a way that the axis of the cone of light was at an angle with respect to the axis of the fiber. When the angle of the light cone is very small, the light is injected into the first of "lower" order bound core modes. As the angle of the light cone increases, the light intensity in the "higher" order bound core modes plus leaky core modes will be increased. This is the present case: the optical axis of the light injected into the fiber was 10° with respect to the fiber axis. In this case the sensitivity of the sensor was found to be about 50% higher than in Example 1. Thus a deformation of the fiber appears to result in stronger coupling of light from the leaky core modes to clad modes than from the bound core modes.

The main conclusion of this example is that the force mode coupling sensitivity of the sensor can be enhanced by injection the light in A modes where A modes are high order bound core modes, or even better, leaky core modes.

Example 5

This example is similar to Example 1, with respect to how the light couples from modes A to modes B. However, the light source and the detector used here are different from the case of Example 1. This example allows a measure of the dependence of the results found in Example 1 upon the type of light sources and detectors used. In this experiment, the light source was an Argon-ion laser emitting 1 watt coherent light at 0.5145 $\mu$m wavelength. The coherent light was passed through a coherence scrambler consisting of a rotating transparent plastic disc which makes the light incoherent. The incoherent light was then focused by a 20× microscope objective on the end of the fiber. A 5 cm section of a 10 meter long fiber was subject to deformation due to the deformer. The deformer was identical to the deformer of Example 1. Weights were added to the top piece during the experiment. A magnified image of the fiber output face was formed by a 20× microscope objective and a projection lens in a plane of a pinhole with an 0.5 mm diameter. As in Example 1, the light in modes A and B could be detected separately. The light transmitted through the pinhole is then focused at the photocathode of a photomultiplier. The output of the photomultiplier was preamplified, amplified, discriminated, and then counted by a linear ratemeter, whose output was recorded. The force mode coupling sensitivity of this Example was found to be $(2.0\pm0.4)\times 10^{-4}$/gm, within experimental error the same as the results of Example 1. This indicates the results are independent of the types of light sources and detectors used. In particular, since the light source used in Example 1 was a Xenon lamp emitting light in a wide wavelength region, from 0.4 to 1.1 $\mu$m, while the light source in this Example was an Argon-ion laser emitting light at 0.5145 $\mu$m, the fact that the results were found to be similar shows that the invented sensor is not strongly wavelength dependent.

The above experiment was repeated with the periods of the interleaving ridges of the two corrugated pieces of the deformer of 0.3 mm and 3 mm. The results were found to be similar to the case of the 1 mm period for small weights (up to 50 gm). The force mode coupling sensitivity was found to be $(1.4\pm0.7)\times 10^{-4}$/gm for a period of 0.3 mm and $(1.6\pm0.3)\times 10^{-4}$/gm for a period of 3 mm. For heavier weights the sensitivity of the sensor with 0.3 mm period was found to be smaller than with 1 mm period in agreement with Example 2.

Example 6

In this Example coherent light was used, which is in contrast to all other examples where the light was incoherent. From the comparison of the results of this example to the other examples, we can see how the responsivity of the invented sensor changes when an incoherent light from a lamp or a light emitting diode is used versus the coherent light from a laser.

In this experiment the light source was an Argon-ion laser emitting coherent light at 0.5145 $\mu$m wavelength. The light was focused by a 20× microscope objective on the end of the fiber. A 5 cm section of the fiber was subjected to deformation due to the deformer. The deformer of Example 1 was used. After the deformer at a short distance, $\sim$20 cm, the fiber passed through two pinholes located on two opposite surfaces of a 1 cm$^3$ cube. The inside surfaces of the cube were covered by 6 photocells whose output was measured by a digital millivoltmeter. The cube was full of glycerine which, having a refractive index higher than that of the fiber clad, coupled out the light from the clad modes, which then was detected. The light in the clad modes, modes B, were the result of coupling from the core modes, modes A, by the deformation. The total power of the light in the core modes was found by bringing the end of the fiber inside the cubic detector. Thus, the ratio of the light power in the clad modes to the core modes were determined as a function of the applied weight on the deformer. The force mode coupling sensitivity was found to be $1.2\times 10^{-4}$/gm. This sensitivity is lower than the one given by Eq. (1), Example 1. This discrepancy should be attributed to an experimental difficulty of detecting all the clad light after the sensing element. The reason for this is that the section of the fiber between the sensing element and the cubic detector was bent. This bending caused some light in the clad modes to radiate away from the fiber before it was detected.

From the results of this example in relation to other examples, we conclude that there was no significant difference in the responsivity of the sensor when coherent or incoherent light was used.

Summary of Examples 1-6

From the comparison of the above static pressure examples we can conclude the following when multimode fibers with a step index profile are used.

(a) The force mode coupling sensitivity of the invented sensor is substantially independent of the optical source. A Xenon lamp or laser gave about the same results. This shows that the sensor does not depend strongly, if at all, on the wavelength of light and on the coherent or incoherent nature of light. In selecting the optical source, the important considerations would be: its cost, its light power, and collimation of the light beam.

(b) The force mode coupling sensitivity of the sensor is also independent of the detector. An inexpensive silicon diode, a cubic photocell, or a more sensitive photomultiplier gave the same results. On selecting the detector, the important considerations would be: its cost, its response time, light sensitivity for the particular optical source used, and how conveniently and easily the detector can be adapted to the geometry.

(c) The shape of the deformer plays an important role in determining the force mode coupling sensitivity of the sensor. We found that an improved coupling was achieved when the deformer was a set of two corrugated plates with interleaving ridges. When one of these plates was flat the sensitivity decreased by almost one order of magnitude. This shows that for a given applied force, bending the fiber introduces more light coupling than squeezing the fiber. The optimum period of the ridges seems to be of the order of 1 mm, even though it was found that the mode coupling of the sensor was not a strong function of the period, for periods from 0.3 mm to 3 mm.

Displacement

Example 7

The previously described experiments were made to measure static pressure in the form of applied weights on the fiber. The purpose of this example is to find the responsivity of the invented sensor when one of the two pieces of the deformer is displaced relative to each other.

In this experiment the light source used was an Argon-ion laser emitting light at 0.5145 μm wavelength. The coherent light became incoherent by passing through a scrambler, i.e., a rotating transparent plastic wheel. Then the light was focused by a 20× microscope objective on the end of the fiber. A 5 cm section of the fiber was subject to deformation due to the deformer. The deformer was a set of two plastic pieces of a corrugated form with interleaving ridges with period of 3 mm. The top piece was attached to a micrometer which could move vertically. The bottom piece was rigidly mounted on a fixed base. Thus, by moving the top piece, the fiber could be deformed by a known amount. A magnified image of the fiber output face was formed by a 20× microscope objective and a projection lens in a plane of a 0.5 mm diameter pinhole. The light transmitted through the pinhole was then focused at the photocathode of a photomultiplier, whose output was amplified, counted and then recorded. It was found that for a thousandth of an inch displacement of the top piece with respect to the lower piece of the deformer:

$$P_B - P_0 = 2.4 \times 10^{-3} \times P_A$$

or $$K' = \frac{P_B - P_0}{P_A} = 0.94 \times 10^{-4}/\mu m$$

where $P_0$ is the power of the background light and $K'$ is the displacement mode coupling sensitivity.

Dynamic Pressure

Example 8

In the above examples, the pressure or displacement applied to the sensor was static in time. In this example, the pressure applied to the deformer changed periodically in time with some frequency. This resulted in a periodic deformation of the optical fiber, which in turn caused periodic coupling of the light from A modes to B modes. In this experiment, light from an Argon-ion laser was made incoherent before injection into the fiber, in a way similar to Example 7. A 5 cm section of the fiber was subject to deformation due to the deformer. The deformer was a set of two plastic pieces with corrugated ridges with interleaving ridges having a period of 3 mm. The top piece was attached to the end of a micrometer which could move vertically. The bottom piece was glued to the center of a stretched drum head. Beneath the drum a speaker was placed in an enclosure. The speaker was driven from a sinusoid signal generator at 70 Hz. When the speaker vibrated, the air coupled the vibrations to the drum which in turn vibrated the bottom piece of the deformer, thereby deforming the fiber.

As in the previous example, Example 7, a magnified image of the fiber output face was formed in the plane of the pinhole. The light transmitted through the pinhole is then detected by the photomultiplier. In this experiment, the output of the photomultiplier was amplified and applied to a low pass filter which eliminated all signals at frequencies higher than 1 KHz. The analog output signal and the signal from the signal generator were viewed on a double trace oscilloscope. The detected signal was found to be sinusoidal with the same frequency as the driver generator.

Example 9

The purpose of this experiment was twofold: first, to check the efficiency of stripping the clad modes before the sensing element and, second, to compare the near field detection system, which was utilized in example 7 and shown schematically in FIG. 19, with the total scattering detection system utilized in example 6 and shown schematically in FIG. 21.

The source system was the same as the one used in example 7. The deformer was a 5 cm. long set of two vertically placed corrugated plates with interleaving ridges with period 1 mm. A 90 cm fiber section before the deformer section of the 3 meter long fiber was stripped by a black paint. This stripping was found to reduce the initial background light power by as much as 50 times.

The light power in modes B before deformation was less than 0.1% of the light power in modes A. The fiber passed vertically through the deformer without any bending of the fiber before or after the deformer and then through the cubic detector which was partly filled with glycerine. The result of this experiment was that the sensitivity K' measured, $K' = 1.2 \times 10^{-4}/\mu m$., was approximately equal to that of example 7.

CALCULATIONS OF MINIMUM DETECTABLE SIGNAL POWER

The following theoretical calculations are presented here for the purpose of emphasizing the sensitivity of the invention which is such that its limits could not be accurately measured by the instrumentation employed in the examples, but could be measured by more sensitive commercially available means. We offer these calculations for illustrative purposes and do not wish to be bound by the veracity of this theoretical approach.

From the results of the above examples and from the knowledge of the characteristics of the commercially available components, the minimum detectable signal of our sensor can be calculated. The minimum detectable signal power is defined as the signal power which is equal to the total noise power. To calculate this sensitivity, the signal, i.e., the power of the light in modes B, should be compared with the various noises present. The minimum detectable power is then related to the minimum detectable pressure, force, or other parameter being measured.

The main steps of these calculations are:

(a) expression of the signal power as a function of the light power in modes A, (b) estimation of the noise due to the background light in B modes in the sensing element.

(c) estimation of the minimum detectable light power by the detectors.

A. Signal Power in the B Modes

The signal light power $P_{SIG}$ in the B modes is given by the following expression $$P_{SIG} = P_B - P_o = K P_A F \quad (1)$$

where $P_B$ is the power in the clad modes, $P_o$ is the background power in modes B, K is the force coupling coefficient, $P_A$ is the power in the bound core modes and F is the applied force.

For the configuration of Example 1, Eq. (1) the value of K is found to be $1.6 \times 10^{-7}$/dyne.

B. Noise in the B Modes

Any fluctuation in the background light, $P_o$, present in the clad of the sensor element is noise. This is minimized by "stripping" the light in the clad which comes from sources outside the sensing region. This stripping is done just before the sensing element. The main noise power in the clad is mainly caused by Rayleigh scattering, S, out of the core in the region L of the sensing element. This noise power, which is the fluctuation in S, we denote as $N_R$. For a fused silica core we have found that the Rayleigh scattering loss $S \simeq 1$ dB/km for wavelength of 0.9 $\mu$m. Thus, $S \simeq 2 \times 10^{-6}$/cm. However, we have found that the angular distribution of the Rayleigh scattering is proportional to $1 + \cos \theta$, where $\theta$ is the angle of observation from the forward direction. Thus, we see that only a fraction, denoted by f, of the light power Rayleigh scattered from the bound core modes will become light propagating forward as clad modes. It can be shown that when the surrounding medium is air $f \simeq 0.2$. By utilizing other surrounding media f can be reduced at least one order of magnitude.

The Noise Power $N_R$ associated with the D. C. background of power $P_o$ is determined from the relationship $$N_R = \sqrt{\frac{P_o t}{hv}} \cdot \frac{hv}{t} \quad (2)$$

where the radical is a measure of the number of photons and hv/t is power per photon, where h is Planck's constant, t is the time interval, and v is the frequency of the light. $P_o$ is given by the following equation:

$$P_o = P_A S f L \quad (3)$$

where L is the length of the sensing region.

The light signal is detected by an electronic device which has its own noise characteristics, thus from Eqs. 1, 2 and 3 we have the signal-to-noise ratio:

$$\frac{P_{signal}}{\text{Total Noise}} = \frac{K P_A F}{\sqrt{\frac{P_A S L f hv}{t}} + N_{det}} \quad (4)$$

If $N_{det}$ is taken to be the "noise-equivalent power" for a silicon PIN detector we have $$N_{det} = \frac{10^{-14} \text{ watts}}{\sqrt{Hz}}$$

For a 1 cps bandwidth, we have $$N_{det} = 10^{-14} \text{ watts} \quad (5)$$

In order to calculate $N_R$ we specify the various parameters shown in Eq. 2 and 3. For L=5 cm, t=1 sec, $v = c/\lambda$ where $c = 3 \times 10^{10}$ cm/sec is the velocity of light in vacuum and $\lambda = 0.9$ $\mu$m is the light wavelength used in these experiments and $S \simeq 2 \times 10^{-6}$/cm. If the fiber is surrounded by air, then we get f=0.2. If $P_A = 10$ milliwatts which is a typical light power for an inexpensive light emitted diode or a GaAs laser, we have:

$$N_R \simeq 6.64 \times 10^{-14} \text{ watts} \quad (6)$$

Recognizing that $N_R$ is proportional to the square root of $P_A$ then the light power $P_A$ could be reduced go 0.25 mwatts before detector limitation would begin to dominate (i.e., $N_D \geq N_R$).

The minimum detectable force $F_{min}$ can be determined by equating signal power, $P_{signal}$, to total Noise Power in Eq. (4), and using K given in example (1) we find $F_{min} = 5 \times 10^{-5}$ dyne. If the area where this force is applied in 10 cm$^2$ then the corresponding pressure $\pi_{min}$ is $5 \times 10^{-6}$ bars.

For higher light power $P_A$, $F_{min}$ and $\pi_{min}$ decrease. Thus, if $P_A = 1$ watt, which corresponds to the case of a gas or a Nd:YAG laser, we find $F_{min} = 5 \times 10^{-6}$ dyne. This would correspond, if the device were to be used as a weighing scale, to $5 \times 10^{-9}$ gm. Assuming an area of B 10 cm$^2$, $\pi_{min} = 5 \times 10^{-7} \mu$ bars.

In general, since $N_{det}$ is not a limiting factor for light powers higher than a milliwatt, from Eq. (4) and the $\lambda^{-4}$ dependence of Rayleigh scattering we have $$F_{min} = \frac{1}{k} \sqrt{\frac{S f hc L \lambda_o^4}{t P_A \lambda^5}} \quad (7)$$

From this equation we see that in order to increase the sensitivity of the invented sensor, i.e., to lower $F_{min}$, we can:

(a) decrease f by minimizing the difference between the refractive indices of the medium surrounding the fiber, $n_m$, and the clad, $n_{cl}$, (b) increase $P_A$, the light power injected in the fiber core, (c) increase K, the coupling sensitivity. This last one can be done by proper design of the deformer, or by proper light injection of the light in the fiber, i.e., by having modes A to be high order guided modes or leaky modes.

C. Displacement

Working in a similar way as before, we can rewrite Eq. (1) as $$P_{signal} = P_B - P_o = K' P_A D; \text{ where } K' = 10^{-4}/\mu m \text{ and}$$

D is the relative displacement of the deformer. This equation is similar to Eq. (1) if we substitute F for D and K for K′. Then if we substitute $F_{min}$ for $D_{min}$ in Eq. (7) and K for K′, we have $$D_{min} = \frac{1}{K'} \sqrt{\frac{S \lambda_o^4 f h c L}{t P_A \lambda^5}} \quad (8)$$

where $D_{min}$ is the minimum detectable displacement. If we use the same values for the various parameters in Eq. (8) for the static pressure case, we can find that with 10 mwatt for core power we can measure displacements of less than 1 Å (i.e., $10^{-8}$ cm).

We claim:

1. A sensor comprising an optical waveguide having means for transmitting light in at least two groups of modes denoted A and B, a pulsed optical light source means for injecting light into said waveguide so that light transmitted at least initially along said waveguide will be substantially in one of said groups, deformer means responsive to an external stress for deforming more than one spaced apart region of said waveguide with such deformation being effective to change the character of the transmission of at least a portion of the light in the vicinity of the deformation from said one group to the said other group of modes, and an optical detector having means to detect a change in the light in one of said groups in more than one of said regions and thereby monitor said external stress and separate the light from different regions by a time delay introduced because of the spatial separation between regions.

2. The sensor as claimed in claim 1 wherein said waveguide comprises one or more inter-connected optical fiber waveguides extending from said light sources and including each of said regions.

3. The sensor as claimed in claim 1 wherein a plurality of optical detectors are provided.

4. The sensor as claimed in claim 3 wherein said waveguide comprises an optical fiber extending from said light source and including each of said regions.

5. The sensor as claimed in claim 1 wherein one of said deformer means is sensitive to pressure and the other of said deformer means is sensitive to temperature.

6. A method comprising injecting pulsed light into an optical waveguide having at least two groups of modes A and B each group containing at least one mode, deforming more than one spaced apart region of the waveguide by application of an external stress, the deformation producing a change in the coupling of light between A modes and B modes, the deformation producing a change in the light power in one of said groups which change is a function of the change in said external stress, and optically detecting a change in said light in one of said groups in more than one of said regions and thereby monitoring said external stress and separate the light from different regions by a time delay introduced because of the spatial separation between regions.

7. A sensor as claimed in claim 6 further comprising a plurality of pressure sensitive enclosures with a said pressure sensitive enclosure connected to a said deformer means so that a change in pressure at each enclosure causes a change in deformation of said regions of said waveguide whereby said sensor measures pressure at each said region.

8. A sensor according to claim 7 further comprising a low frequency pressure transmitting device extending through the wall of at least one of said enclosures and which allows the pressure inside the enclosure to be essentially equilibrated with low frequency components of the pressure external to the enclosure so that the change in deformation of the waveguide is determined only by high frequency components of said external pressure.

9. The sensor as claimed in claim 8 wherein said low frequency components are less than one Hertz, and said high frequency components are greater than 20 Hertz.

10. The sensor as claimed in claim 7 wherein said pressure sensitive enclosure is a hydrophone.

11. A sensor as claimed in claim 6 wherein at least one of said deformer means comprises at least two materials having dissimilar thermal expansion coefficients and arranged to cause a change in deformation of said region of said waveguide upon a change in temperature whereby said sensor is used to measure temperature.

* * * * *